United States Patent
Sykes et al.

(10) Patent No.: US 12,403,597 B1
(45) Date of Patent: Sep. 2, 2025

(54) INTUITIVE VIRTUAL REALITY INTERFACE FOR CONTROLLING ROBOTS

(71) Applicant: Altec Industries, Inc., Birmingham, AL (US)

(72) Inventors: Jonathan Westin Sykes, Gower, MO (US); Robert Nichols, Saint Joseph, MO (US); David F. Lindquist, Cameron, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 18/927,001

(22) Filed: Oct. 25, 2024

(51) Int. Cl.
*B25J 19/02* (2006.01)
*B25J 9/02* (2006.01)
*B25J 9/16* (2006.01)
*G02B 27/01* (2006.01)

(52) U.S. Cl.
CPC ............. *B25J 9/1661* (2013.01); *B25J 9/023* (2013.01); *B25J 9/161* (2013.01); *B25J 19/023* (2013.01); *G02B 27/0172* (2013.01)

(58) Field of Classification Search
CPC ...... B25J 19/023; B25J 9/1689; B25J 9/1661; B25J 9/161; G02B 27/0172
See application file for complete search history.

(56) References Cited

U.S. PATENT DOCUMENTS

| | | |
|---|---|---|
| 5,822,891 A | 10/1998 | Fujishima et al. |
| 11,660,750 B1 | 5/2023 | Sykes et al. |
| 11,689,008 B1 | 6/2023 | Nichols et al. |
| 11,697,209 B1 | 7/2023 | Mourlam et al. |
| 11,717,969 B1 | 8/2023 | Mourlam et al. |
| 11,742,108 B1 | 8/2023 | Naber et al. |
| 11,749,978 B1 | 9/2023 | Lindquist et al. |
| 11,794,359 B1 | 10/2023 | Sykes et al. |
| 11,839,962 B1 | 12/2023 | Nichols |
| 11,997,429 B2 | 5/2024 | Sykes et al. |
| 2001/0055525 A1* | 12/2001 | Inokuchi ............ B25J 5/06 414/730 |
| 2016/0171862 A1 | 6/2016 | Das et al. |
| 2018/0057318 A1 | 3/2018 | Benton et al. |

(Continued)

OTHER PUBLICATIONS

U.S. Appl. No. 18/967,103 Non-Final Office Action issued Feb. 25, 2025.

*Primary Examiner* — Dalena Tran
(74) *Attorney, Agent, or Firm* — Erise IP, P.A.

(57) ABSTRACT

Systems and methods for providing a virtual reality interface operable to control a robot system by an operator are disclosed. In some embodiments, the robot system is provided on a boom of an aerial device. The robot system is operable to carry out instructions for performing work-related tasks in a work environment. An operator may interact with a virtual reality system providing the virtual reality interface to operate the robot system. The virtual reality interface may provide various menus and icon features that, when selected, cause display of menus and functions of the virtual reality interface. The virtual reality interface may provide a list of tasks to be performed and instructions to perform those tasks. In some embodiments, the icon features are presented based on the tasks to be performed and selection of the icon features initiates automated actions of the robot system to perform certain tasks.

20 Claims, 14 Drawing Sheets

(56) References Cited

U.S. PATENT DOCUMENTS

| | | |
|---|---|---|
| 2018/0179029 A1 | 6/2018 | Schoonmaker |
| 2021/0107156 A1 | 4/2021 | Park et al. |
| 2021/0331321 A1 | 10/2021 | Sykes et al. |
| 2022/0036302 A1* | 2/2022 | Cella ................ G06N 20/00 |
| 2022/0347863 A1* | 11/2022 | Priest ................ B25J 13/006 |
| 2023/0113312 A1 | 4/2023 | Junio |
| 2023/0168670 A1* | 6/2023 | Von Reventlow ....... B25J 9/163 |
| | | 701/2 |
| 2023/0255571 A1* | 8/2023 | Grajales ............. A61B 5/7465 |
| | | 351/246 |
| 2024/0025049 A1 | 1/2024 | Zhu et al. |
| 2024/0033916 A1 | 2/2024 | Sykes et al. |
| 2024/0033925 A1 | 2/2024 | Mourlam et al. |
| 2024/0033928 A1 | 2/2024 | Mourlam et al. |
| 2024/0038413 A1 | 2/2024 | Naber et al. |
| 2024/0039265 A1 | 2/2024 | Nichols et al. |
| 2024/0160229 A1* | 5/2024 | Rana ................ G05D 1/693 |
| 2024/0166475 A1 | 5/2024 | Chettibi |
| 2024/0372350 A1 | 11/2024 | Nichols et al. |

\* cited by examiner

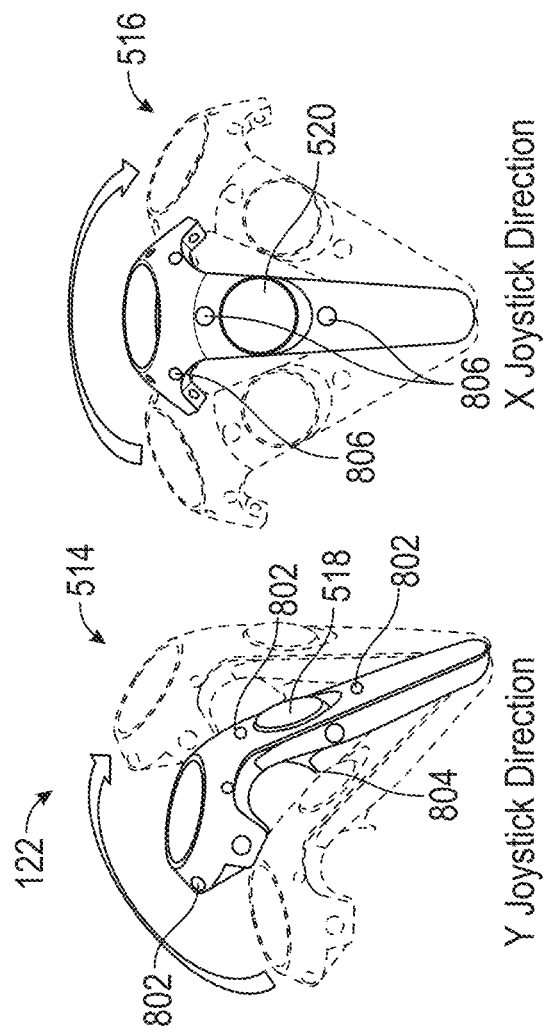
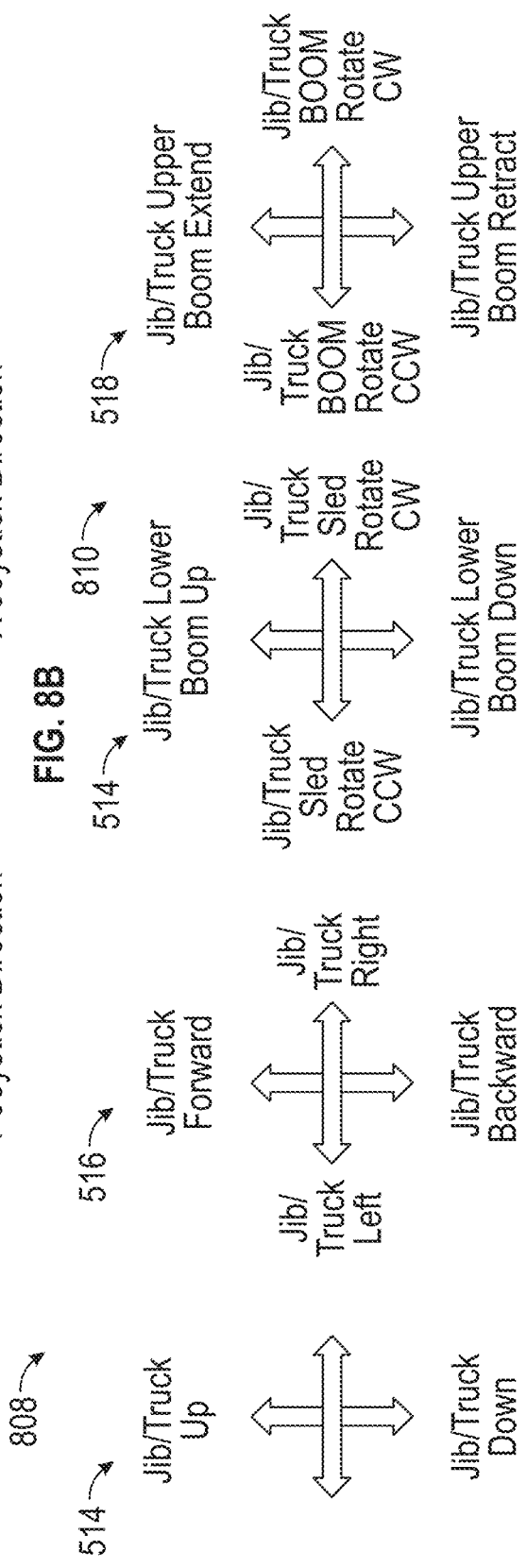
FIG. 8B
FIG. 8C

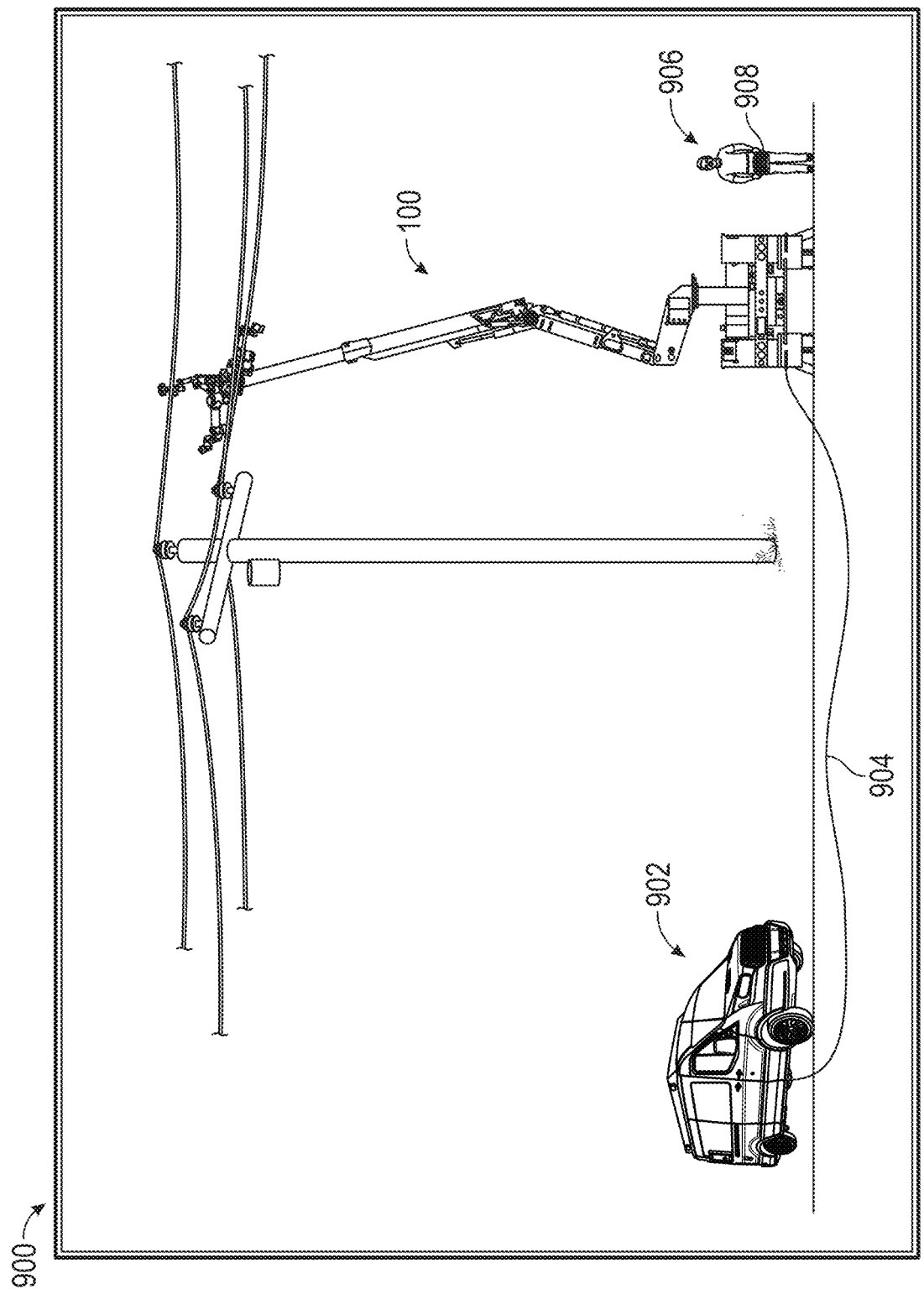

INTUITIVE VIRTUAL REALITY INTERFACE FOR CONTROLLING ROBOTS

BACKGROUND

1. Field

Embodiments of the current disclosure relate to virtual reality interfaces. More specifically, embodiments of the current disclosure relate to systems and methods of providing intuitive virtual reality interfaces for controlling robots.

2. Related Art

Typically, telerobotics for conducting work require manual operation by operators using wired or wireless communication methods. The operators may stand at a remote location and control the robot to perform work-related tasks. The operator may observe the robot's actions by line of site or by a video feed provided on a display occasionally showing a perspective of the robot. These methods are limiting in that the operator may operate the robot while viewing a screen with a video feed with no options but to control the robot manually.

Alternatively, a robot may be programmed to perform a specific operation typically without the operators input. The operator may initiate the automation and observe while the robot carries out the automated actions. When the automation is complete, the operator may then set up the next automation and initiate the next automation. The set up between automations typically requires movement of a part or uploading a new set of instructions to carry out the next operation. This takes time and is labor intensive. Furthermore, when operating on power lines or telecommunication lines, robots may be in contact with high-energy lines requiring substantive work and time to change parts and upload new coding to perform automated actions.

What is needed are systems and methods of providing manual control and automated control of robots to complete work tasks by a single all-encompassing virtual reality user interface.

SUMMARY

Embodiments of the current disclosure solve the above-described problems and provide a distinct advance in the art by providing a user friendly customizable virtual reality interface for controlling robots.

An embodiment of the current disclosure is directed to a system providing a virtual reality user interface for use with a remotely controlled robot to complete a work task. The system includes a robot configured to perform work in a work environment, at least one camera associated with the robot and configured to provide a video feed, a display configured to display the video feed from the at least one camera, one or more input devices configured to receive inputs from an operator, at least one processor, and one or more non-transitory computer-readable media storing computer-executable instructions that, when executed by the at least one processor, perform a method of providing the virtual reality user interface. The method includes obtaining the video feed from the at least one camera, causing display of the video feed by the display, generating a menu including a plurality of icon features, causing display of the menu on the display and over the video feed, receiving, by the one or more input devices, a selection of an icon feature of the plurality of icon features of the menu, and initiating automated control of the robot based on the selection of the icon feature.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein:

FIGS. 8A-8C depict exemplary operation of virtual input devices for some embodiments;

FIGS. 9A and 9B depict an exemplary arrangement of a jobsite for some embodiments;

Figure 1:
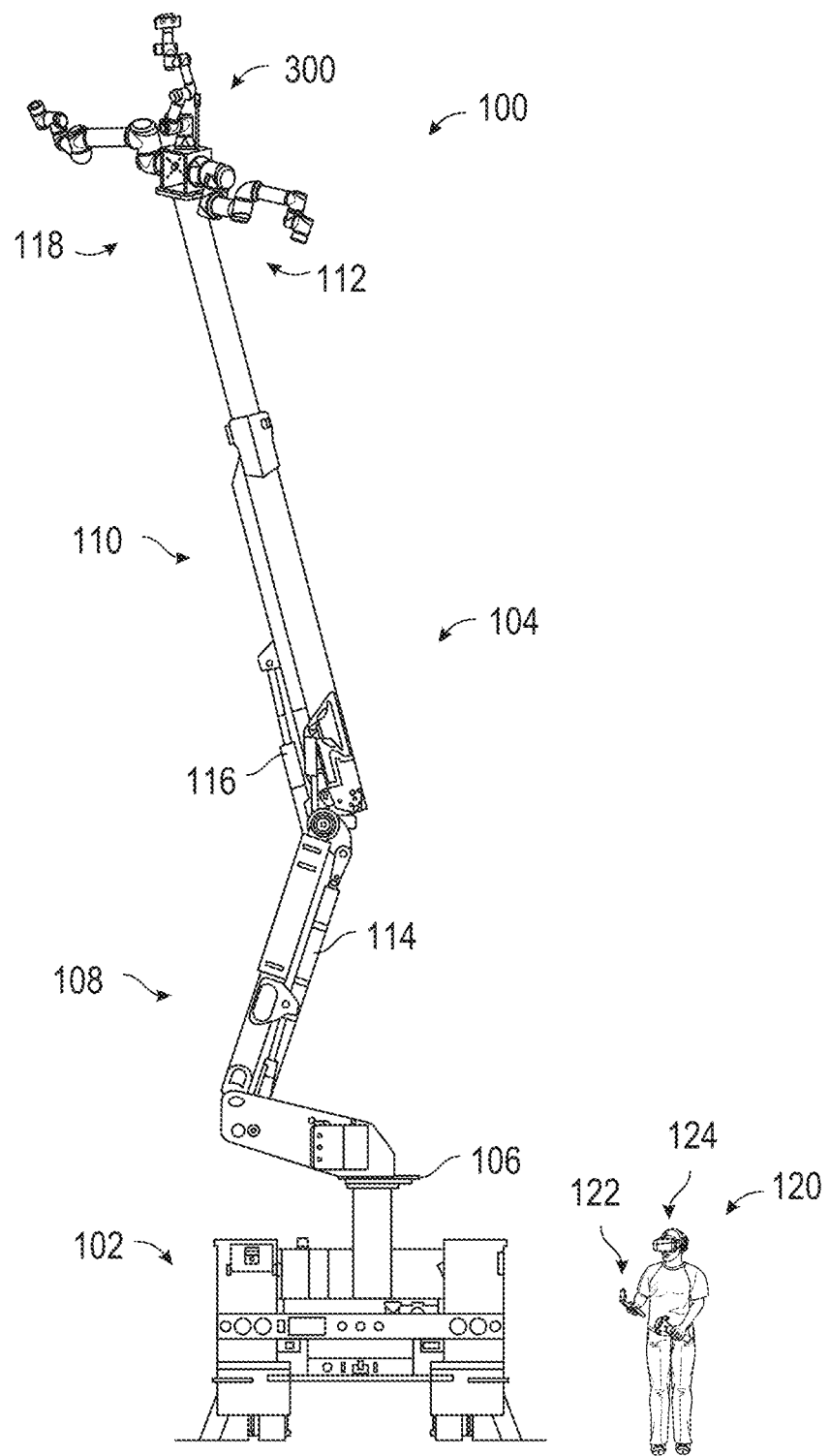
FIG. 1 depicts an exemplary aerial device and operator.

The drawing figures do not limit the invention to the specific embodiments disclosed and described herein. The drawings are not necessarily to scale, emphasis instead being placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment", "an embodiment", "embodiments", "various embodiments", "certain embodiments", "some embodiments", or "other embodiments" mean that the feature or features being referred to are included in at least one embodiment of the technology. Separate references to "one embodiment", "an embodiment", "embodiments", "various embodiments", "certain embodiments", "some embodiments", or "other embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the current technology can include a variety of combinations and/or integrations of the embodiments described herein.

Generally, embodiments of the current disclosure provide a virtual reality system providing a virtual reality interface for controlling robots. In some embodiments, an operator may control a robot system comprising various operable robots to perform work-related tasks on power and telecommunication lines. The robot system may be disposed at a boom tip of an aerial device configured for powerline work. The operator may be positioned near the aerial device or at a remote location and operate the robot system in real time utilizing input devices and viewing the area through a headset display displaying a virtual reality interface.

In some embodiments, the virtual reality interface may display images in a video feed from various cameras capturing the work environment of the robot system. Furthermore, the virtual reality interface may display graphics comprising customizable and selectable menus and sub-menus configured to initiate action by the robot systems. Furthermore, the virtual reality interface may cause display of information related to the state of the aerial device and the robot system, current actions/tasks being performed, and future actions/tasks to be performed. The graphics may be displayed over the video feed such that the operator can see the work environment along with the graphics simultaneously.

In some embodiments, the graphics may present various selectable icon features associated with the virtual reality input devices of the virtual reality system. The operator may select inputs on the input devices to highlight and select the icon features of the virtual reality interface. Selection of the displayed icon features may result in activation of automated control programing to control the robot systems to perform automated tasks. Upon selection and upload of the work-related tasks, task scripts may upload and cause display of coaching screens, meta scripts, quick menus, and flyout menus by virtual reality interface. The graphics may provide instructions and selectable icons features based on the selected task. For example, a coaching screen and meta scripts may provide a list of actions and instructions for completing the tasks. A quick menu may display selectable icon features that initiate operations that are necessary to complete the tasks. Furthermore, flyout menu may provide automation options and tool selection icons that are necessary to complete the tasks. The virtual reality interface may be automatically populated with all options the operator. Furthermore, the operator may customize the options presented by utilizing a main menu to add and subtract icon features from the various menus.

Aerial Platform

FIG. 1 depicts an aerial device 100 relating to some embodiments. Aerial device 100 may be attached to utility vehicle 102, as shown. In some embodiments, aerial device 100 comprises boom assembly 104 and turntable 106 that may be disposed on utility vehicle 102, as shown. Boom assembly 104 may comprise lower boom section 108 attached to turntable 106 at a proximal end and upper boom section 110 pivotably attached to a distal end of lower boom section 108, as shown. In some embodiments, either or both lower boom section 108 and upper boom section 110 may include a telescoping portion for telescopically extending and retracting the length of boom assembly 104. Furthermore, in some embodiments, a utility platform may be included, attached at a distal end (or boom tip 112) of upper boom section 110. Alternatively, or additionally, in some embodiments, aerial robot system 300 may be disposed at boom tip 112 of upper boom section 110. In some embodiments, and as described in greater detail below, aerial robot system 300 may be adapted for performing telecommunications repair, powerline repair, general repair work, or other actions that may be performed by a robot. For example, aerial robot system 300 may comprise one or more utility tools for performing actions such as sawing, cutting, screwing, wiring, or other actions associated with repair work. In some embodiments, boom assembly 104 may be used to position aerial robot system 300 in a remote location, such as, for example adjacent to an energized power line (e.g., aerial power system 402) in aerial work environment 400.

In some embodiments, aerial device 100 may be used for performing work on or near high-voltage power lines. As such, aerial device 100 may be operated near electrically powered high-voltage cables. In some embodiments, aerial robot system 300 and boom assembly 104 comprise insulating material for electrically insulating aerial device 100. Furthermore, any electrical components disposed in a utility platform and on boom assembly 104 may be self-contained and separate from the electrical components of utility vehicle 102. As such, a dielectric gap is created between aerial robot system 300 and utility vehicle 102. In some embodiments, utility vehicle 102 may generally be referred to as a base, and may be any of a vehicle, a crane, a platform, a truck bed, a mechanical tree trimming apparatus, a hydraulic lift, or any other base capable of supporting boom assembly 104 and aerial robot system 300, as will be described in further detail below.

In some embodiments, boom assembly 104 comprises one or more cylinders for controlling motion of boom assembly 104 such as lower boom cylinder 114 disposed between the turntable 106 and lower boom section 108 and upper boom cylinder 116 disposed between the lower boom section 108 and the upper boom section 110, as shown. In some embodiments, lower boom cylinder 114 and upper boom cylinder 116 may be actuated hydraulically using a hydraulics system of the boom assembly 104. However, embodiments are contemplated in which other suitable actuation techniques may be employed to actuate the cylinders such as, for example, electrical actuation, pneumatic actuation, and magnetic actuation. Furthermore, in some embodiments, a combination of different actuation techniques may be used. Embodiments are contemplated in which boom assembly 104 comprises one or more rotary actuators. For example, in some embodiments, boom assembly 104 comprises a slew drive for controlling rotation of any respective joints of the boom assembly 104 as described in more detail below.

In some embodiments, lower boom cylinder 114 may control an angle of rotation of lower boom section 108 relative to turntable 106. Similarly, upper boom cylinder 116 may control an angle of rotation of upper boom section 110 relative to lower boom section 108. Additionally, in some embodiments, pivotable connection 118 may be included at boom tip 112 between the distal end of upper boom section 110 and aerial robot system 300 for controlling the angle of aerial robot system 300. In some such embodiments, pivotable connection 118 may be configured to automatically maintain an upright orientation of aerial robot system 300. For example, pivotable connection 118 may include one or more gyroscopes, accelerometers, strain gauges, and the like and/or interface with a control system for maintaining the upright orientation of aerial robot system 300 such that aerial robot system 300 is held in an upright position regardless of the orientation of boom assembly 104. Additionally, or in the alternative, embodiments are contemplated in which the orientation of aerial robot system 300 may be controlled manually by operator 120 using input devices 122 and head-up display 124.

Aerial Robot System

Figure 2:
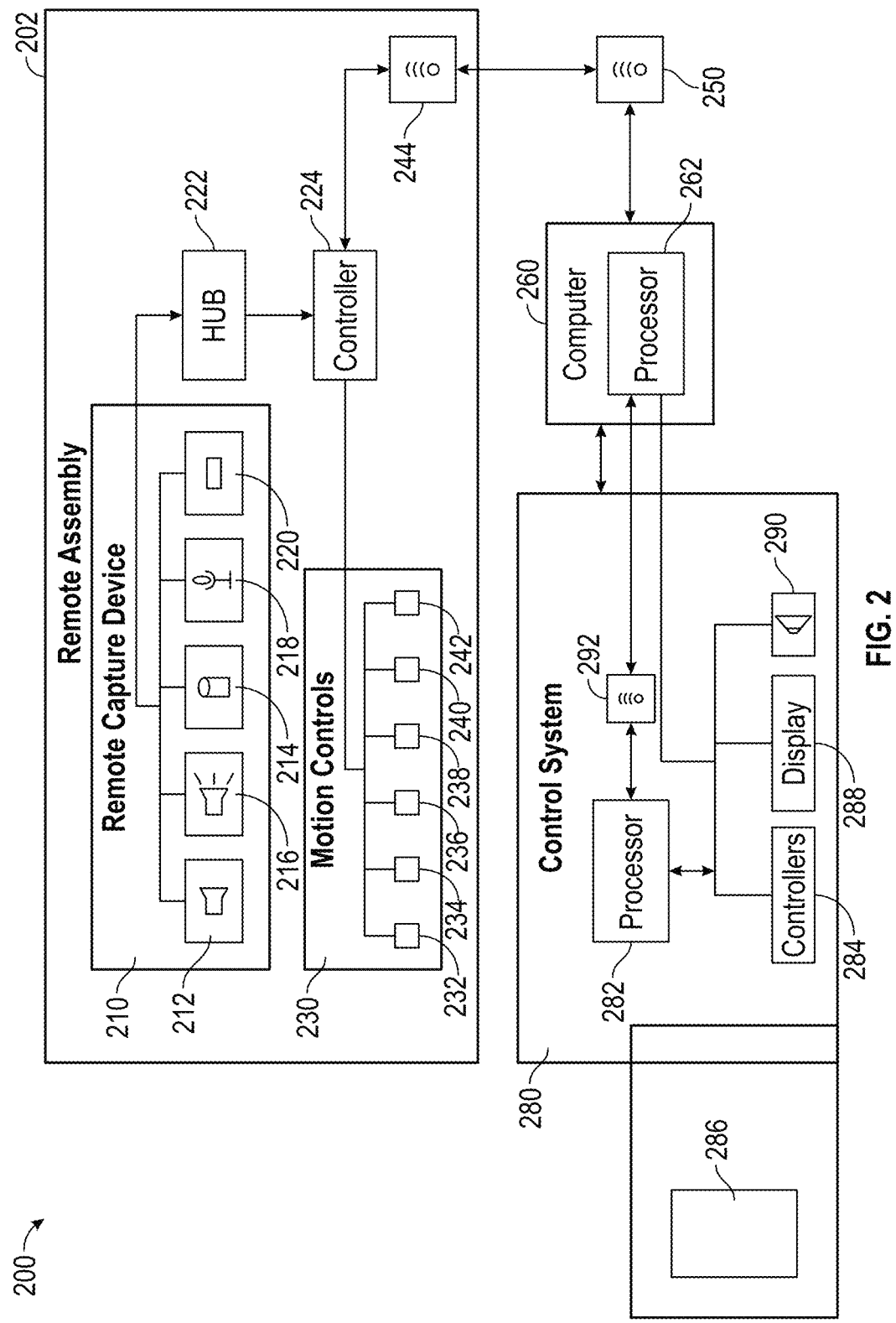
FIG. 2 depicts exemplary hardware configuration of the aerial device for some embodiments of the disclosure.

FIG. 2 depicts exemplary block diagram 200 related to embodiments of the present disclosure. In some embodiments, aerial robot system 300 comprises various assemblies, sub-assemblies, parts, or components for capturing sensory information and/or for performing actions, such as repair work in a telecommunication setting. In some embodiments, aerial robot system 300 comprises remote assembly 202 depicted in FIG. 2. Aerial robot system 300 may comprise various circuitry, parts, or other components for capturing sensory information, including video, three-dimensional depth information, audio, and other sensory data. Furthermore, aerial robot system 300 may comprise a manually controlled or autonomous robot unit that may be positioned at boom tip 112 of boom assembly 104 for interacting with aerial power system in aerial work environment 400 (FIG. 4) to perform one or more tasks. For example, as described above, in many real-life scenarios, tasks to be performed may not be discovered until reaching the jobsite, and/or detecting the aerial work environment, and accordingly, the robot unit may comprise a variety of tools, features, or functions to respond to a variety of tasks. Additionally, as described in greater detail below, aerial robot system 300 may further comprise one or more parts, components, or features for providing operator 120 with sensory information, providing operator 120 with additional information about aerial work environment to improve efficiency for both the aerial robot system 300 and operator 120.

As depicted in block diagram 200, aerial robot system 300 comprises remote assembly 202, remote capture device 210, computer 260, and control system 280. In some embodiments, and as described in greater detail herein, remote capture device 210 may be configured and adapted for the capturing of sensory information and may be positioned in the aerial work environment on one or more robots (e.g., robot unit 302 and auxiliary arm 304) for capturing of sensory information that may be utilized by computer 260, to present information to operator 120 via control system comprising input devices 122 and head-up display 124, among other purposes. FIG. 2 depicts exemplary sensors, cameras, and other apparatuses that may be utilized by remote capture device 210 for the capturing of sensory information. Remote capture device 210 may be mounted or positioned on a selectively movable mount or portion of aerial robot system 300. For example, aerial robot unit 302 may be positioned at boom tip 112 of a boom assembly 104 for aerial application. However, remote capture device 210 may also be used with a robot unit that is not attached to boom assembly 104, and for example, may be utilized with a robot unit for ground application or attached to a mechanical arm (e.g., auxiliary arm 304) or an aerial drone. Accordingly sensory information may be captured by remote capture device 210 at any location.

Through selective inputs, including both manually inputted instructions and/or automated instructions, remote capture device 210 may capture video, still images, three-dimensional depth information, audio, electrical conductivity, voltage, among other information that may be captured by a sensor or recording device. For example, remote capture device 210 may comprise camera 212 for the capturing of video or still images (collectively, "video"). In some embodiments, camera 212 may be at least one camera or a plurality of cameras. Camera 212 may be positioned on remote capture device 210 for the capturing of video within a selected field of view. The resolution of the video captured by camera 212 may vary, but in some embodiments, camera 212 may be configured for capturing in at least 720p resolution but may capture in higher resolution including but not limited to 1080p, 2K, 4K, or 8K resolution. However, it will be appreciated that camera 212 may be any currently known or yet to be discovered camera for capturing video. Video captured from camera 212 may be stored locally at remote capture device at a local memory 214. Local memory 214 may be any of the storage or memory described below with respect to FIG. 7. The storing of video and other sensor data at local memory 214 may aid in providing a failsafe or backup storage of captured video in the event of a transmission or upload failure. Further, the storing of video and sensor data at local memory 214 may aid in situations of poor wireless connection or if a direct line becomes loose or interrupted, preventing the immediate transmission of captured video. Optionally or additionally, video captured from camera 212 and other sensor data may be transmitted to computer 260 for processing, analyzing, storage, and/or for later transmitting to control system 280. In further embodiments, video captured from camera 212 may be directly transmitted to control system 280 for processing.

In some embodiments, remote capture device 210 may further comprise at least one three-dimensional camera 216 or other device configured for capturing three-dimensional depth information. As described in greater detail below, three-dimensional camera 216 may be utilized for capturing three-dimensional depth information within a field of view for creating a point cloud, 3-D model, or other digital representation of an object or area scanned or viewed by three-dimensional camera 216. Three-dimensional camera 216 may be operated in conjunction with, or independent from camera 212 or other components or parts of remote assembly 202 and/or remote capture device 210. As described in greater detail below, in response to instructions or an input, three-dimensional camera 216 may begin capturing three-dimensional depth information about an object or area within a field of view. Like the captured video with respect to camera 212, the three-dimensional depth information captured by three-dimensional camera 216 may be saved locally at local memory 214. In some embodiments, remote capture device 210 may comprise a separate local memory 214 for video captured by camera 212 and a separate local memory 214 for three-dimensional information captured by three-dimensional camera 216. As described in greater detail below, remote capture device 210 may comprise a microphone 218 and/or sensor 220, which may be one or more or a plurality of sensors, for capturing additional sensory information. Accordingly, in some embodiments, a separate and distinct local memory 214 may be used for each sensory capture device (i.e., camera 212, three-dimensional camera 216, microphone 218, and/or sensor 220). In further embodiments, remote capture device 210 may comprise single memory 214 for the storing of all captured sensory information. As described above and in further embodiments, three-dimensional information may be directly sent to computer 260 in addition to or instead of storing locally at memory 214.

In addition to capturing video and/or three-dimensional information, it may also be advantageous for remote capture device 210 to capture additional sensory information that may be presented to operator 120 and/or processed by computer 260 for autonomous control. For example, in certain scenarios it may be advantageous for remote capture device 210 to capture audio via at least one microphone 218. Continuing with the running example, remote assembly 202 for use with telecommunications repair may utilize audio information for diagnostic or safety purposes. For example, audio information may capture the sounds of the jobsite and/or aerial work environment, and audio information may be processed to determine a state of the jobsite. Accordingly, in some embodiments, remote capture device 210 may comprise at least one microphone 218 for the capturing of audio information. Similar to the video and three-dimensional information as described above, captured audio information may be stored locally at memory 214 and/or transmitted to computer 260 and/or control system 280.

Similar to audio information, remote capture device 210 may further comprise sensor 220 for the capturing of additional sensory information, metrics, and/or data. For example, continuing with the running example, remote capture device 210 may be used with remote assembly 202 positioned at the end of boom assembly 104 for telecommunication or powerline work on aerial power system 402 in aerial work environment 400. In such a work application, remote assembly 202 may be working on or near live powerline or other conductive lines transferring electricity. Accordingly, in some embodiments, remote capture device 210 may comprise sensor 220 configured as an electricity sensor measuring current, voltage, and/or a magnetic field for determining whether a cable or powerline has electricity running through it. However, it will be appreciated that remote capture device 210 may comprise additional sensors configured and adapted for providing remote capture device and/or remote assembly 202 with additional information. By way of non-limiting example, sensors may be sensor 220, in some embodiments, comprising any of the following sensors/devices: a gyroscope, an accelerometer, a thermometer, a barometer, a light emitter, a photodiode, a voltmeter, an ammeter, a magnetic field sensor, a strain gauge, a pressure gauge, among other sensors/devices that may be utilized in the intended application of remote assembly 202.

In some embodiments, remote assembly 202 may further comprise at least one digital hub 222. In some embodiments, remote assembly 202 further comprises at least one digital hub 222. Digital hub 222 may receive the captured sensory information from remote capture device and convert the captured sensory information into a format suitable for transmitting to computer 260 and/or control system 280. In some embodiments, digital hub 222 is a USB Hub, such as, for example, a USB 3.0, ethernet switches, and/or future advancements.

As further depicted in FIG. 2, remote assembly 202 may further comprise controller 224. In some embodiments, controller 224 may be one or more processors or other circuitry or computer hardware for receiving commands or instructions from control system 280 and/or computer 260 and for relaying or providing commands to remote capture device 210 and/or motion controls 230. Accordingly, in some embodiments, instructions or commands from controller 224 may be sent to remote capture device 210. For example, instructions sent from controller 224 to remote capture device 210 may include instructions to begin recording video via camera 212 (e.g., robot camera 426). However, it will be appreciated that instructions sent from controller 224 may cause any of the components of remote capture device 210 to begin capturing sensory information, including but not limited to three-dimensional information, audio information, or other sensory information captured by any of the sensors 220 of remote capture device 210. Additionally, controller 224 may be used to send instructions to cause remote assembly 202, remote capture device 210, and/or motion controls 230 to perform other actions corresponding to the instructions. For example, instructions from controller 224 may instruct remote capture device 210 to store captured sensory information on memory 214. Additionally, instructions from controller 224 may be sent to motion controls 230 to instruct remote assembly 202 to perform a movement. Further, controller 224 may be in communication with transceiver 244 for communicating with computer 260 and/or control system 280 to send sensory information or other data or information to computer 260 and/or control system 280. Similarly, controller 224 may further be configured for receiving instructions, commands, or other information from computer 260 and/or control system 280.

Figure 3:
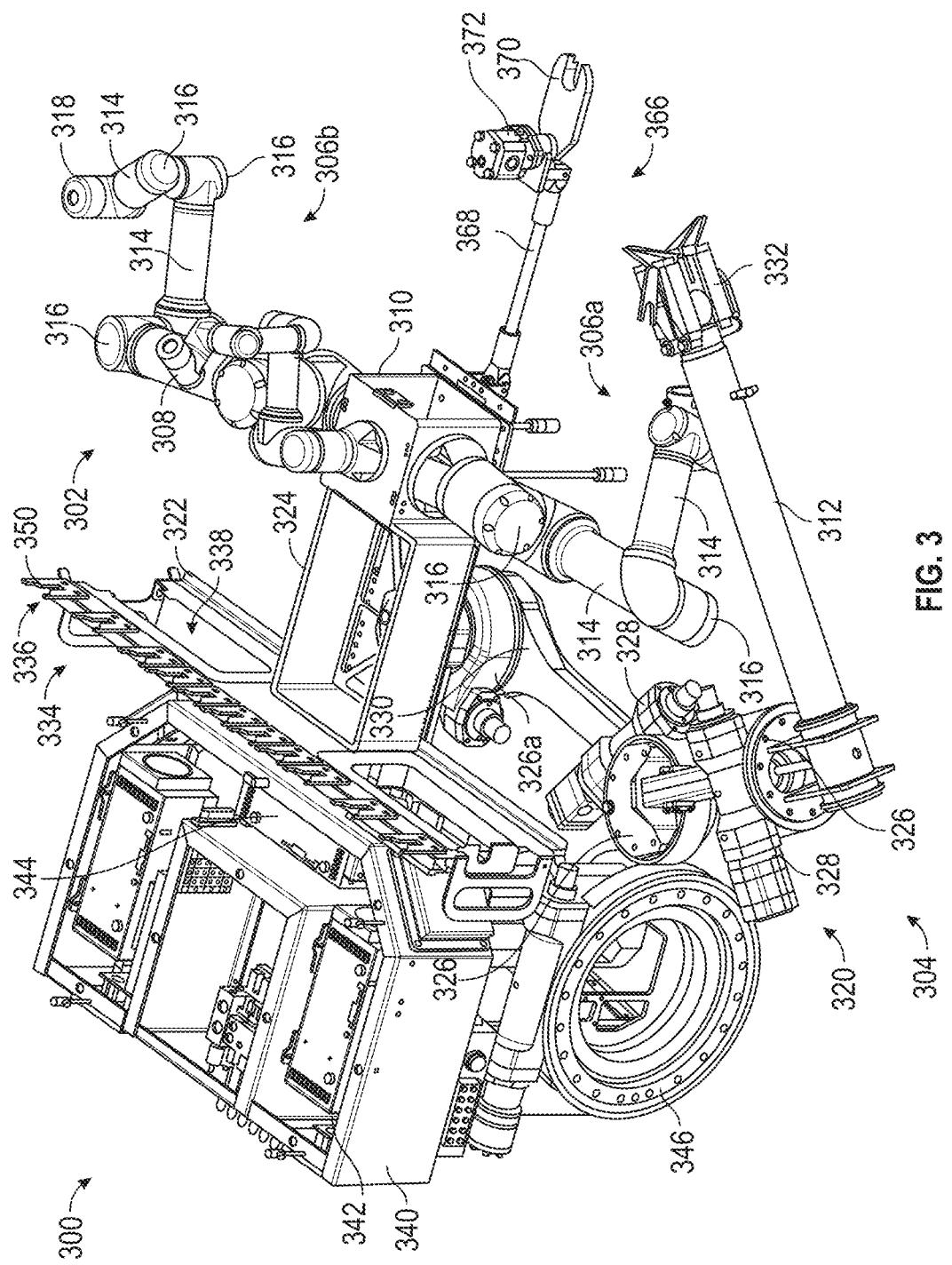
FIG. 3 depicts an exemplary robot unit for some embodiments of the disclosure.

As further depicted in the block diagram of FIG. 2 and in some embodiments, remote assembly 202 may further comprise motion controls 230. Motion controls 230 may be configured and adapted for controlling the movement of remote assembly 202, including any utility arms or camera mounts as described in greater detail below. In some embodiments, remote assembly 202 may comprise a 6 DOF robot unit configured with utility arms and/or camera mounts that can move with 6 DOF. Accordingly, motion controls 230 may be configured to provide instructions or commands to remote assembly 202 to move in 6 DOF. In some embodiments, motion controls may comprise x-axis control 232, y-axis control 234, z-axis control 236, pitch control 238, yaw control 240, and/or roll control 242 for moving remote assembly 202 with 6 DOF. It will be appreciated however, that remote assembly 202 may comprise varying designs, and in some embodiments, may move in fewer than 6 DOF. Accordingly, in further embodiments, motion controls 230 may comprise controls configured and adapted for moving remote assembly 202 in an appropriate number of planes. Furthermore, as shown in FIG. 3, robot unit 302 may comprise a plurality of joints providing various locations for that may each provide 6 DOF movements.

As described above, motion controls 230 may be in communication with controller 224. Instructions or commands from controller 224 may be sent to motion controls 230. Upon receipt of the instructions, the corresponding controls 232, 234, 236, 238, 240, and/or 242 may be instructed to cause movement of remote assembly 202 based on the received instructions. As described above, one or more arms or limbs of remote assembly 202 may be configured to move with 6 DOF. Based on the instructions, the corresponding motion controls 230 may cause movement of remote assembly 202 to correspond to the instructions.

As described above, remote assembly 202 may be communicatively coupled to computer 260. In some embodiments, computer 260 may be directly coupled to remote assembly 202, such that computer 260 and remote assembly 202 are a combined system. For example, computer 260 may be directly installed into a frame or body of remote assembly 202. Accordingly, remote assembly 202 and computer 260 may be in direct communication through cables or other direct methods. In further embodiments, computer 260 may be located external to remote assembly 202. When located externally, remote assembly 202 and computer 260 may nevertheless be communicatively coupled. For example, in some embodiments, remote assembly 202 and computer 260 may be coupled through a physical connection such as a fiber optic cable, an Ethernet cable, and/or USB cable. In further embodiments, remote assembly 202 and computer 260 may be coupled through a wireless connection, such as WIFI, Bluetooth®, cellular connection, or another wireless connection. In embodiments in which computer 260 and remote assembly 202 are connected through a wireless connection, transceiver 244 may communicate with another transceiver 250 coupled or otherwise in communication with computer 260.

In some embodiments, computer 260 may receive and process sensory information captured by remote capture device 210 of remote assembly 202. Accordingly, computer 260 may comprise at least a processor 262 for executing commands, which may include instructions for processing, analyzing, or utilizing captured sensory information. For example, as described in greater detail below, computer 260 may utilize captured three-dimensional information to generate a point-cloud, three-dimensional model, or other digital representation of an object or area captured by remote capture device 210.

In some embodiments, control system 280 may be an interface, apparatus, or system providing a user with an interactive medium for interacting with computer 260 and/or remote assembly 202. For example, in some embodiments, control system 280 may comprise at least one processor 282, at least one controller 284, at least one display 288, at least one sensor 290, and at least one transceiver 292. In some embodiments, processor 282 may comprise a server capable short-range, local network, and wide area network communication As described in greater detail below, some embodiments of the present teachings provide for a method of controlling remote assembly 202 from a remote location. Continuing with the running example, oftentimes telecommunications repair or powerline repair sometimes occur during or immediately after a severe weather storm. This type of scenario can include dangers such as exposed and live powerlines, high winds, lightning, and other dangers that pose a risk to human workers. Accordingly, it may be advantageous for an operator of remote assembly 202 to control remote assembly 202 in a safe location, such as in a work truck or building away from the jobsite. Accordingly, control system 280 may comprise at least one controller 284, providing interactive systems and methods for a user to input commands or instructions for controlling or manipulating remote assembly 202.

Controller 284 may be any interface for inputting commands or instructions that can be transmitted and processed by a computer or other hardware. By way of non-limiting example, controller 284 may comprise hand-held motion control controllers and interface controllers (e.g., input devices 122). As described in greater detail below, the motion control controllers may be beneficial for operator 120 to perform specific movements or actions that can be captured and relayed to remote assembly 202 to perform. Through the use of motion-control controllers, operator 120 may be provided with a sensory effect similar to being at the jobsite and performing the actions themselves. However, controller 284 is not limited to motion controls and instead, controller 284 may be any interface (e.g., input devices 122) for operator 120 to input instructions or commands for remote assembly 202. For example, in further embodiments, controller 284, which may be input devices 122, may be a handheld controller, similar to that of a video game controller comprising thumbsticks, buttons, triggers, and/or other interfacing inputs. In further embodiments, controller 284 may comprise a joystick and button design. In even further embodiments, controller 284 may be a mouse and keyboard. In even further embodiments, controller 284 may be configured as a glove or interactive model of a hand, allowing an operator to perform native hand manipulations which may be captured and transmitted to remote assembly 202. In even further embodiments, controller 284 may comprise a camera component or other motion capture component for capturing the movement of an operator. For example, in addition to, or in place of a physical controller handled by the operator, a camera component may capture the movement of the operator. The captured movement may be transmitted to computer 260 for translation or mapping movement of remote assembly 202. Optionally, or additionally, motion capture aids, such as motion capture dots, may also be used for capturing movement of the operator. In some embodiments, it will be appreciated that the examples provided herein are intended to be illustrative, rather than limiting, and that controller 284 may be any apparatus or method of receiving instructions or an input from an operator.

In some embodiments, control system 280 may further comprise a power medium 286 for powering one or more parts or components of the control system, including for example controller 284, display 288, or the at least one sensor 290, or any combination thereof. In some embodiments, a single power medium may power all parts or components of control system 280. In further embodiments, individual parts or components of control system 280 may comprise a separate and distinct power medium 286. For example, first power medium 286 may be used for powering controller 284 and a second power medium 286 may be used for powering display 288. Power medium 286 may be any conventionally known power source for providing power to an electrical device, including but not limited to an internal power source such as a battery, or an external battery source such as an electrical outlet.

As further depicted in FIG. 2, control system 280 may further comprise at least one display 288. In some embodiments, display 288 may be a monitor, touchscreen, television screen, or other display with reference to FIGS. 5A-5B and 6A-6B described below. In some embodiments, at least a portion of the captured sensory information from remote capture device 210 may be displayed on display 288, which may be head-up display 124 in some embodiments for operator 120 to view. For example, captured video may be displayed on display 288. Providing sensory information on display 288 may provide an operator with a more immersive feel when remotely operating remote assembly 202. Through a real-time video feed, operator 120 may experience the jobsite as if operator 120 was physically present, even if operator 120 is in a safe location miles away. Additionally, providing sensory information to operator 120 via display 288 may aid operator 120 in inputting instructions or commands via controller 284.

In some embodiments, control system 280 may further comprise at least one sensor 290, which may provide additional sensory affect to the operator 120 and/or capture additional inputs that may be used by computer 260 to provide instructions to aerial robot system 300. In some embodiments, one or more sensors may be combined with controller 284 and/or one or more sensors may be combined with display 288. For example, in some embodiments, sensor 290 may be at least one speaker or sound emitting device to provide operator 120, foreman operator 906 (FIG. 9), and any other local or remotely positioned person, with audio information captured from remote capture device 210 or pre-recorded or pre-rendered audio. In further embodiments, the at least one sensor 290 may be one of an accelerometer, a gyroscope, a light sensor, or any other type of sensor 290 suitable to detect the viewing angle of the user or the movement, position, or angle of the operator's body.

In some embodiments, and as described in greater detail below, operator 120 may utilize controller 284, display 288, and the at least one sensor 290 to provide instructions to remote assembly 202, which may be analyzed and translated into instructions to cause remote assembly 202 to move or perform an action. As also described in greater detail below, operator 120 may input instructions or commands through control system 280, which may be input devices 122. In some embodiments, inputs may be inputted or captured by a combination of controller 284 and display 288. For example, display 288 may be coupled to a head-mounted unit (e.g., head-up display 124) as described in greater detail below. Operator 120 may move their head or torso with sensor 290 capturing the movement and/or viewing angle of operator 120. The captured movement data or viewing angle may be sent to computer 260 via transceiver 292, and computer 260 may take the captured movement data or viewing angle and translate into instructions for causing remote assembly 202 to move and mimic or replicate the operator's movement and match the viewing angle of the operator.

Aerial Work Environment and Aerial Robot Systems

Figure 4:
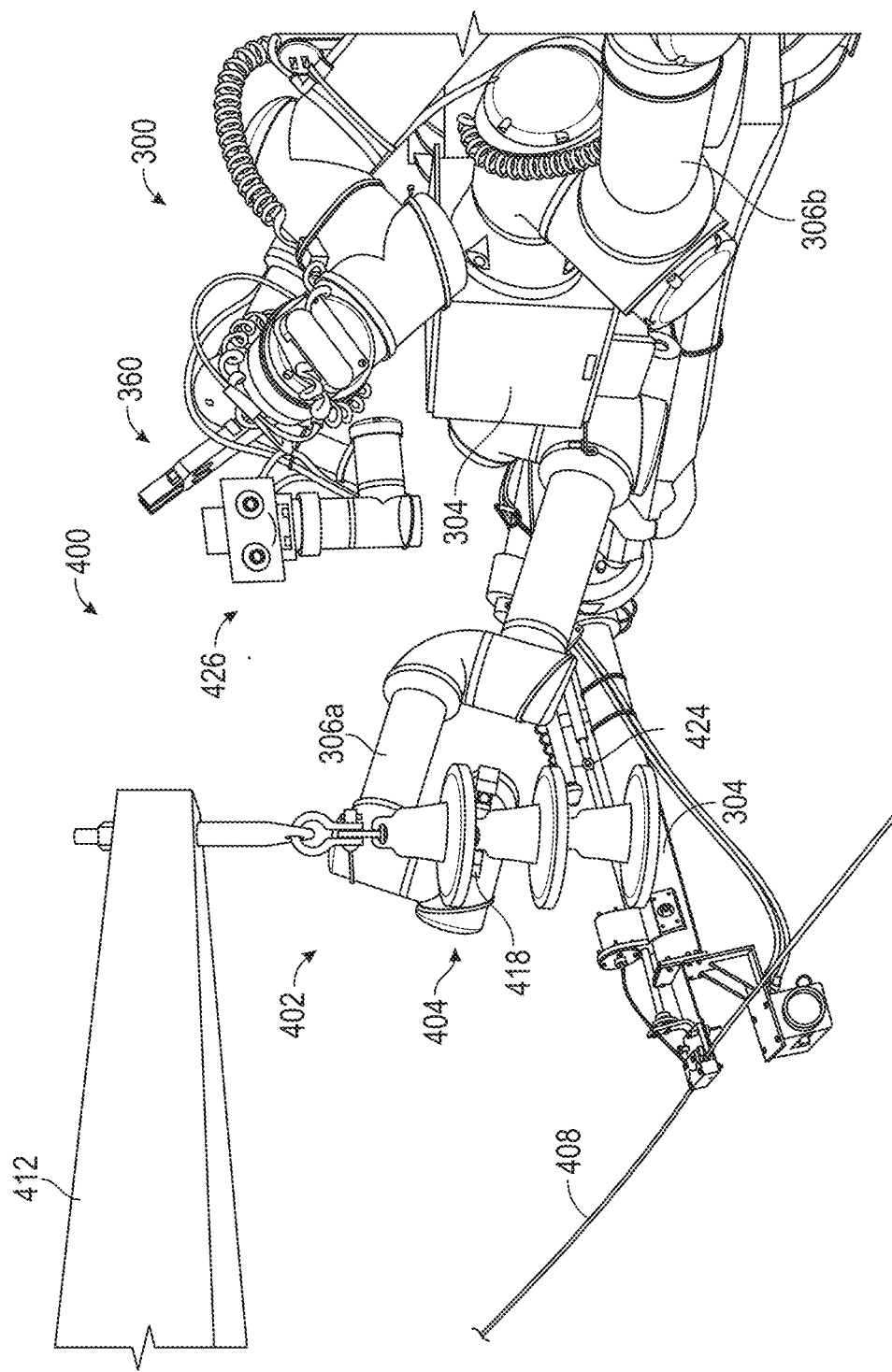
FIG. 4 depicts an exemplary work environment of the robot unit.

FIGS. 3-4 illustrate an exemplary aerial robot system 300 comprising robot unit 302 and a high-capacity manipulator or auxiliary arm 304 in accordance with embodiments of the present disclosure. As shown, robot unit 302 may comprise first utility arm 306a, second utility arm 306b, and a camera mount 308, in some embodiments comprising camera 212. In some embodiments, utility arms 306a, 306b may be configured to perform work operations, such as removing and installing parts (e.g., insulators) on a utility pole. In some embodiments, camera mount 308 is a camera-supporting robotic arm to which camera 212 is coupled and that provides operator 120 a view of the remote location as if operator 120 was themselves in the remote location. Utility arms 306a, 306b and camera mount 308 may be coupled to central hub 310. Central hub 310 may have dimensions approximating a human torso such that utility arms 306a, 306b extend off opposite lateral sides of central hub 310 to mimic the arms of operator 120, while camera mount 308 may extend off a top surface of central hub 310 to mimic the head of operator 120, thereby allowing operator 120 to operate robot unit 302 in a manner that mimics that operator 120 was in the remote location performing the energized power line work.

As described above, robot unit 302 may be adapted for performing repair work, maintenance work, or other similar situation, tasks, or actions. To perform these actions, robot unit 302 may comprise at least one utility arm generally references as utility arms 306a, 306b. Like camera mount 308 as described above, each of utility arms 306a, 306b may comprise a plurality of utility arm segments 314 that may be separated by pivotable joints 316, which may be motorized and, in some embodiments, prismatic joints. The number and size of utility arm segments 314 and pivotable joints 316 may vary depending on the embodiments and application of robot unit 302. Generally, in response to an instruction or commands, one or more of pivotable joints 316 may activate to rotate or move utility arms 306a, 306b. In some embodiments, the pivotable joints 316 may be used to move utility arms 306a, 306b in the X-axis, Y-axis, Z-axis as well as control the roll, pitch, and yaw of utility arm 306a, 306b. Accordingly, through movement in the 6 DOF, each utility arm 306a, 306b may mimic or replicate the movement of arms and hands of operator 120.

In some embodiments, the distal ends 318 of utility arms 306a, 306b may comprise one or more tools, flanges, or other apparatus for performing an action such as repair work. In some embodiments, distal ends 318 may comprise an adapter or may be otherwise configured for accepting a tool. In some embodiments, operator 120 may manually replace tools or operator 120 may initiate automated actions to replace tools as described below.

In some embodiments, aerial robot system 300 may comprise auxiliary arm 304. Auxiliary arm 304 may work in or near the same lateral plane as utility arms 306a, 306b. Providing an exemplary jib 312 in such a side-by-side configuration with utility arms 306a, 306b, may reduce the overall envelope of aerial robot system 300 as compared to an over-the-top arm. That is, robot unit 302 and auxiliary arm 304 in a side-by-side configuration may be maneuverable through tight spaces (e.g., between phases of aerial power system 402) because the height of aerial robot system 300 is reduced.

In some embodiments, robot unit 302 may be supported, or disposed on and coupled to platform 322. Furthermore, auxiliary arm 304 may be coupled to platform 322 by coupling assembly 320. Platform 322 may provide a frame for supporting the other components of aerial robot system 300. That is, platform 322, in some embodiments, provides a structural framework connecting all components of aerial robot system 300 to boom assembly 104. In some embodiments, platform 322 may be coupled to pivot joint 346.

As shown, pivot joint 346 may comprise a slew drive system actuatable to maintain a level configuration of aerial robot system 300. For example, sensors 290 may comprise an inertial measurement unit (IMU) comprising accelerometers, gyroscopes, and the like. The sensor data may be obtained and processed by remote assembly 202 and output slew drive commands to maintain a level configuration of aerial robot system 300 relative to a measured gravity vector. In this way, aerial robot system 300 may maintain a level configuration.

In some embodiments, coupling assembly 320 may connect auxiliary arm 304 to an underside of robot unit 302, platform 322 (e.g., structure frame) below a receptacle 324 (discussed further below). Coupling assembly 320 may comprise linkages, joints (e.g., pivot joints), and the like to connect auxiliary arm 304 to platform 322 further supporting robot unit 302. In some embodiments, coupling assembly 320 may comprise auxiliary actuators 326, which, in some embodiments, may be slew drives (as shown), a rotator linkage, linear actuators, and the like. In some embodiments, coupling assembly 320 is configured to provide auxiliary arm 304 with one-, two-, three-, four-, five-, or six-degrees of freedom. Auxiliary actuators 326 may be actuated by motors 328 providing movement to auxiliary linkages and auxiliary arm 304. Auxiliary commands to control the movement of auxiliary actuators 326 may be provided by operator 120 utilizing input devices 122 and/or automated controllers based on automated algorithms described herein.

Auxiliary arm 304 may also comprise end effector 332, which may be interchangeable with other end effectors such that an appropriate end effector may be selected based on the work task to be performed. For example, as shown below in FIG. 4, end effector 332 may be a vise (or other coupler) that couples to an energized phase 408 to electrically bond robot unit 302 to the energized phase 408 for performing maintenance work on energized components of the aerial power system 402. Auxiliary arm 304 may further be configured to, for example, move phase 408 out of the way of robot unit 302 while robot unit 302 performs work on other power line components.

In some embodiments, robot unit 302 may comprise tool rack 334 and parts holder 338. Tool rack 334 may store tools that are usable by utility arms 306a, 306b for operating on aerial power system 402 in aerial work environment 400 and may include pin pullers (e.g., for decoupling a pinned connection as discussed further below), gripper tools for grabbing an object, and any other tools generally used in aerial line maintenance and repair that are adapted to connect to utility arms 306a, 306b, and/or auxiliary arm 304. In some embodiments, utility arms 306a, 306b may be configured to automatically retrieve tools from tool rack 334 and put away tools into tool holders 336. For example, responsive to receiving an instruction to retrieve or store a tool, aerial robot system 300 may automatically perform the instructed action without requiring any further input from operator 120. Tool rack 334 is discussed in more detail below.

In some embodiments, parts holder 338 may hold parts that aerial robot system 300 may use during a work operation in work environment 400, such as parts to be installed onto a utility pole. For example, parts holder 338 may hold an insulator that may be automatically retrievable by utility arms 306a, 306b for installation onto the utility pole. Parts holder 338 is discussed in more detail below.

In some embodiments, aerial robot system 300 further comprises utility box 340. Utility box 340 may be disposed on and coupled to platform 322. As such, utility box 340 may rotate along with platform 322 by pivot joint 346 described above. Utility box 340 may provide a housing configured to contain power systems 342 as well as sensors and computing hardware systems described below and illustrated in FIG. 7. As such, utility box 340 may provide all power, electrical, hydraulic, and pneumatic systems necessary to carry out the processes described herein.

Power system 342 which may be batteries, motors generating hydraulic, pneumatic, electric, and mechanical energy, and the like. Any power system that may be necessary in carrying out the descriptions herein may be power system 342. Furthermore, electronics package 344, which in some embodiments, may comprise the hardware system of FIG. 7 as well as any sensors and controllers described herein may be housed in or communicatively connected to electronics package 344 of utility box 340.

In some embodiments, aerial robot system 300 may comprise alternate auxiliary arm 366. Alternate auxiliary arm 366 may extend from a front side of robot unit 302 coupled to platform 322 below central hub 310. In some embodiments, alternate auxiliary arm 366 may provide a known length that operator 120 may use as a reference when controlling aerial robot system 300 to approach energized components in aerial work environment 400. Furthermore, alternate auxiliary arm may comprise components such as, shaft 368, implement 370, and auxiliary actuator 372 to perform operations. Alternate auxiliary arm 366 is discussed in more detail below and illustrated in FIGS. 5A-5B.

All parts of aerial robot system 300 described in reference to FIG. 3 may be controlled by operator 120 utilizing input devices 122 and/or all parts may of aerial robot system 300 may be automatically controlled to perform stored instructions when initiated by operator 120 selecting icons displayed on virtual reality display 500 described below.

In some embodiments, as depicted in FIG. 4, specialized tools 360 may be used to couple to manipulators located at a distal end of each of utility arms 306a, 306b and auxiliary arm 304. For example, insulator 404 may be adapted to provide a long rod portion for ease of gripping by high-dexterity clamp 418. Furthermore, insulator 404 may be fashioned with ring bolts such that robot unit 302 may utilize high-dexterity clamp 418 for grabbing and rotating. Furthermore, tools 360 may comprise various hot-stick tools, which may be adapted to couple to the manipulators (e.g., utility arms 306a, 306b, and auxiliary arm 304) to provide ease of use. Hot-stick ring tools may be provided in various sizes to be used in tie-wire wrapping and unwrapping and hot line hooks may be used to simplify snagging a cable. Similar to high-dexterity clamp 418, a 4-bar linkage gripper may be adapted or configured to be coupled to manipulators providing high-capacity gripping. Further, a phase cutter (not shown) may be modified to couple to utility arms 306a, 306b and/or auxiliary arm 304. Furthermore, a clamp, tool adapter, and manipulator adapter may be used to couple tools 360 to the manipulators and to various tool holders when tools 360 are not in use as described above.

Here, high-dexterity clamp 418 may be clamped onto insulator 404 while auxiliary arm 304 is coupled to phase 408 by one of the various tools 360. Auxiliary arm 304 may hold phase 408 while robot unit 302 removes insulator 404 from crossmember 412. Various tools may be necessary for this task, and robot unit 302 may exchange tools 360 as needed by placing disposing tools onto tool rack 334 and removing other tools from tool rack 334. Furthermore, auxiliary arm 304 may bond onto aerial power system 402 by bonding unit 424.

In some embodiments, operator 120 may control robot unit 302 and auxiliary arm 304 to remove an aerial component (e.g., insulator 404) that needs to be replaced. Continuing with the exemplary embodiment described above, operator 120 may control auxiliary arm 304, or operator 120 may initiate an automated task by selecting icons on VR interface 502 to grasp and bond to phase 408 and control utility arms 306a, 306b to remove nuts, bolts, and tie wires, to remove phase 408 from insulator 404 and to remove insulator 404 from crossmember 412. Removal of insulator 404 may be performed by operator 120, automatically by preprogramed control algorithms (e.g., automated tasks), or by a combination of the two. For example, as shown in FIG. 4, insulator 404 may be held by first utility arm 306a using high-dexterity clamp 418 while auxiliary arm 304 holds phase 408 and second utility arm 306b may remove wire ties to release insulator 404 from phase 408. Once phase 408 is released, second utility arm 306b may remove nuts and bolts utilizing a ratchet and drill tool (not shown) to release insulator 404 from crossmember 412.

After insulator 404 has been removed from crossmember 412, operator 120 may manually control first utility arm 306a to rotate to the shoulder-up configuration to dispose insulator 404 into receptacle 324 as shown in FIG. 3. In some embodiments, operator 120 may select an icon displayed by VR interface 502 corresponding to an automated mode and initiate automation coding to control first utility arm 306a, and any other components of aerial robot system 300. In some embodiments, the automated mode may be based on the location of the receptacle and the type of aerial component (e.g., insulator 404). The automated mode may process a series of commands controlling first utility arm 306a to dispose insulator 404 into receptacle 324 as shown.

In some embodiments, receptacle 324 may be disposed behind robot unit 302 and configured to receive waste including wire ties, nuts, bolts, insulators, and the like. Receptacle 324 may comprise a box as shown, which may be any shape including square, rectangular, circular, elliptical, cubic, spherical, ovoidal, and the like. Furthermore, in some embodiments, an insert may be placed inside receptacle 324. The insert may be configured to protect the interior of receptacle 324 and the aerial component (e.g., insulator 404) placed into receptacle 324.

Virtual Reality Interface

Turning now to FIGS. 5A-5B and 6A-6B, in some embodiments, VR display 500 displays VR interface 502 comprising images referenced herein as video feed 504 displaying images/video from camera 212 (e.g., robot camera 426). VR display 500 may be display 288 and may be or comprise head-up display 124 or any other monitor, tablet display, mobile device display, television display, or any other display as described in embodiments above. For example, VR interface 502 may be presented to operator 120 by VR display 500 (FIGS. 5A-5B and FIGS. 6A-6B) configured on head-up display 124. As described above, operator 120 may interact with control system 280 comprising input devices 122 and head-up display 124 to control remote assembly 202 comprising aerial robot system 300. Furthermore, operator 120 may interact with input devices 122 to control a curser, scroll icons, highlight icons, and select icons displayed by VR interface 502 as described in detail below.

Figure 5A:
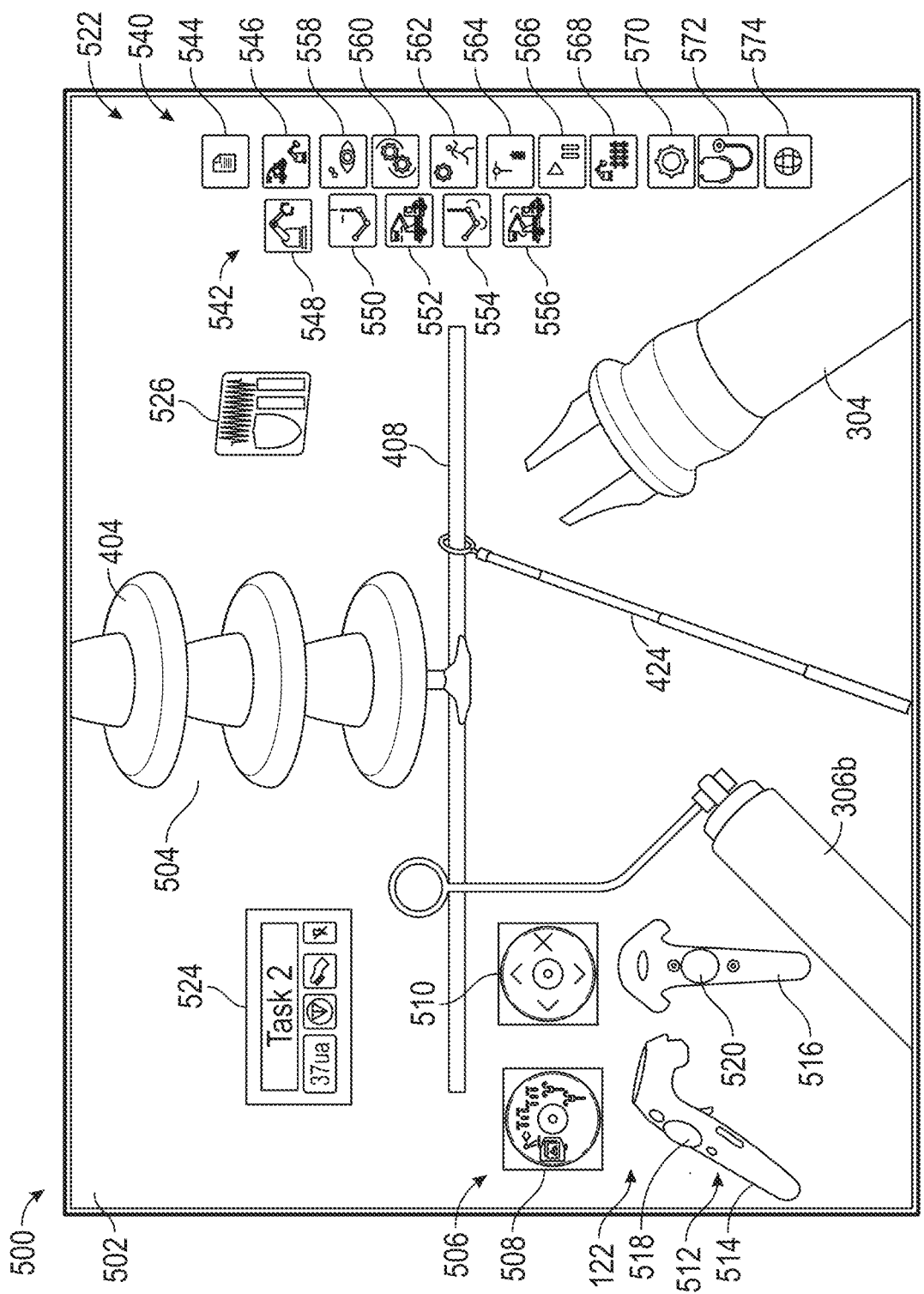
FIGS. 5A and 5B depict an exemplary virtual reality interface providing a main menu and a flyout menu for some embodiments.

FIG. 5A depicts an embodiment of VR display 500 providing VR interface 502 illustrating an exemplary video feed 504 from robot camera 426. Here, work environment 400 is displayed with icons 522 displayed over video feed 504. Video feed 504 may be received from robot camera 426; however, this is exemplary, and any images may be shown from any of cameras 212 described above. Furthermore, VR interface 502 may display video or images from any cameras 212 as well as any data from any sensors and analytics indicative of work environment 400 and the state of robot system 300. The displayed graphics may be customizable and selectable by operator 120 to display submenus including analytic data. As described herein, any data associated with aerial device 100 and work environment 400 may be displayed. In some embodiments, network data may also be displayed. Data may be obtained from local user devices connected via short-range communication or by a local or wide area networks. For example, video feed 504 may be received from a foreman on the ground utilizing a camera to take pictures and video providing operator 120 an additional viewing perspective. Foreman operator 906 is described in more detail below.

As described above, FIG. 5A depicts VR display 500 showing video feed 504 from robot camera 426. Furthermore, for illustrative purposes, input devices 122 comprising left hand control 514 and right hand control 516 are shown. In some embodiments, input devices 122 comprise control inputs 512 such as, for example, left pad 518, right pad 520, as well as various buttons, and triggers. Control inputs 512 may be manipulated by operator 120 to control the operations of aerial device 100 as described above, and may be used to control VR interface 502. Operator 120 may select a VR interface selection mode where operator 120 may engage control inputs 512 to select icons 522 on VR display 500 presented by VR interface 502. In VR interface mode, a curser (not shown) may be displayed allowing operator 120 to move around VR interface 502 and select various icons using a thumb pad or any other control inputs 512 of input devices 122. In some embodiments, operator 120 may scroll through menu items and select various icons, as well. For example, main menu 540 is shown. Main menu 540 comprises various main menu items that are selectable by operator 120. In some embodiments, operator 120 may move curser over main menu 540 and select a main menu item. In some embodiments, operator 120 may select an input of control inputs 512 to select a menu item. Selection of control inputs 512 may cause display of main menu 540 and/or highlight a first item of main menu (e.g., meta scripts icon 544). Operator may then scroll through main menu items using control inputs 512 of input devices 122.

In some embodiments, operation of aerial device 100 may be halted, or locked while images and icons are displayed by VR interface 502. VR interface 502 may display certain menus and operations over video feed 504. As such, the view of operator 120 may be obstructed by the various items displayed. Therefore, in some cases, it may be necessary to lock operation of all or some components of aerial device 100 while items are displayed. Locking operations may be customizable by operator 120 and may also be overridden by operator 120 and/or foreman operator 906 as described in detail below.

In FIGS. 5A-5B and 6A-6B an exemplary scenario of changing insulator 404 is depicted in video feed 504. Here, the video feed 504 is from robot camera 426 and captures auxiliary arm 304 and left utility arm 306b as well as insulator 404, phase 408, and bonding unit 424. The video feed 504 shows the current work task and is shown for illustrative purposes only. The displayed task of changing insulator 404 is generically referenced below as "Task 2;" however, Task 2 may reference any tasks described herein, and any operations may be displayed by video feed 504.

Figure 5B:
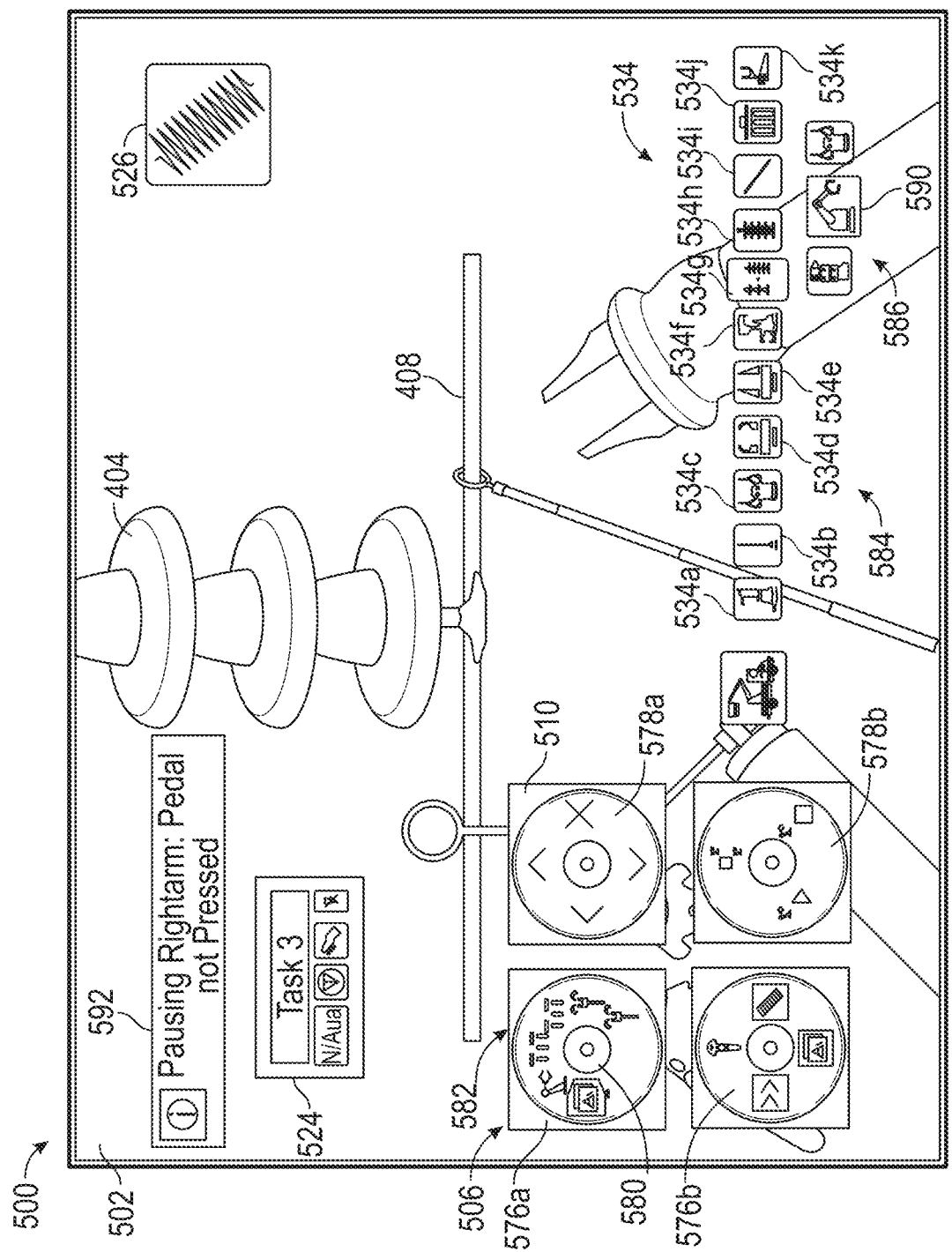

In some embodiments, operator 120 may interact with VR interface 502 to select the various items provided by various menus. In some embodiments, the various menus may comprise at least three distinct menus providing intuitive functions. In some embodiments, the various menus may comprise main menu 540, quick menu 506, and flyout menu 534 (FIG. 5B). The three menus described herein are exemplary, and menus may comprise various other menus and/or submenus. Furthermore, the various features described in relation to each menu may be accessible by other menus and other features provided by VR interface 502 as described in detail below.

In some embodiments, VR interface 502 may display main menu 540. Main menu 540 is selectable by operator 120 utilizing input devices 122 and input devices 122 may be used to navigate main menu 540 and other menus described herein. Furthermore, quick menu 506 may be displayed illustrating inputs and input functions by VR interface 502. Here, right hand controls 510 depict up, down, left, and X icons. Operator 120 may move right pad 520 up and down to highlight each main item on main menu 540. Furthermore, operator 120 may press down on right pad 520 to select an item and/or to display a submenu associated with the item. Furthermore, left hand controls 508 display various selectable icons that may be displayed according to customizable options by operator 120 described in more detail below and in reference to FIG. 5B. Quick menu 506 is described in detail below and in reference to FIG. 5B.

As illustrated in FIG. 5A the first main menu item is meta scripts icon 544. In some embodiments, meta scripts icon 544 provides a submenu of selectable meta script items. Each main menu item (e.g., icons 522) may display a submenu icon. For example, meta scripts icon 544 may provide a meta script submenu providing options for running various meta scripts. When an option is selected, a meta script (e.g., meta scripts 618, 620, FIGS. 6A and 6B) may display steps to complete a work task. Meta scripts may be associated with computer-executable programing that may run for operator 120 to perform work tasks such as, for example, replacing insulators (suspension and tension), cutting a jumper and tying back to a conductor, splicing a jumper back together, and the like. These tasks are exemplary, and it should be understood that any steps for completing tasks may be displayed by selection of items on main menu 540 by selecting meta scripts icon 544. Here, operator 120 may select various icons representing meta scripts for display while completing the tasks. The meta scripts and operator coaching assistant is described in more detail below and may be displayed by meta scripts 618, 620 in FIGS. 6A and 6B and coach screen 616.

The second main menu item shown is control target icon 546. Here, an exemplary control target submenu (e.g., submenu 542) is displayed when control target icon 546 is selected. In some embodiments, a number, or "S" for submenu, or the like may be displayed on a main menu icon indicating that submenu 542 will be displayed when selected. As shown here, control target icon 546 comprises a border indication. The border indication may comprise a colored border, a thickness border that is thicker than other borders, a textured border, or the like. As such, it may be clear to operator 120 that selection of any menu icon described herein that comprises border indication may display a submenu 542.

Here, control target submenu comprises various control target submenu icons. Each control target submenu icon may be selectable resulting in switching of hand control functionality to control various parts of aerial device. For example, selection of utility arm icon 548 provides control of utility arms 306a, 306b to input devices 122. Selection of utility control Cartesian icon 550 provides control of auxiliary arms 304, 366, and utility arms 306a, 306b to input devices 122 utilizing Cartesian coordinate control. Selection of boom Cartesian control icon 552 provides boom assembly 104 control to input devices 122 utilizing Cartesian coordinate control. Selection of utility joint icon 554 provides control of each selectable joint of utility icon. Selection of boom assembly joint icon 556 provides control of each selectable joint of boom assembly 104 to input devices 122. The icons and controls described here are exemplary and it should be understood that control of any operable parts of aerial device 100 may be provided by selection of icons 522 displayed by VR interface 502.

The exemplary third main menu icon displayed provides selectable control of cameras 212 including robot camera 426. Here, operator 120 may select robot camera icon 558 and remote assembly 202 provides control of robot camera 426 to operator 120. Operator 120 may then move robot camera 426 by providing input to input pads 518, 520, of input devices 122. As such, operator 120 may move input pads 518, 520 and/or input devices 122 to move robot camera 426 in any 6 degree of freedom direction in a standard Cartesian coordinate system including standard orthogonal directions x, y, z, and p, q, r, rotations about the x, y, z axes.

In some embodiments, selection of robot camera icon 558 may provide display of robot camera icon submenu providing selectable options for stored automated actions and restricted movements of robot camera 426. For example, selection of menu items controlling robot camera 426 may include moving robot camera 426 a programed distance (e.g., 10 centimeters) in any direction, rotating robot camera 426 a programed amount (e.g., 5 degrees), flipping robot camera 426 to view above or below a wrist joint of the utility arms 306a, 306b, and the like. Any movement of robot camera 426 may be programed and stored to assist operator 120 in quick changes for displaying video feed 504 by VR interface 502.

In some embodiments, robot camera icon menu/submenu may provide additional selectable icons for controlling other functions of camera 212 (e.g., robot camera 426. Camera 212 functions that may be controlled by selecting icons include disconnecting and connecting camera 212 and displaying and pausing video feed 504, restricting and allowing motion (e.g., stop rotate and stop translation), stop and resume meta scripts for camera movements, and sending camera 212 to a designated home position. Any camera operations may be controlled via selection of icons provided on VR interface 502.

In some embodiments, general automations icon 560 may be provided by VR interface 502 and may be selected to provide a general automations submenu comprising selectable icons that provide automation of components of remote assembly 202. In some embodiments, VR interface 502 may provide selections to control various functions of the aerial robot system 300 such as, for example, automating utility arms 306a, 306b and auxiliary arm 304 to an arms straight out position. Automating utility arms 306a, 306b to a straight-out position may unwind joints that have reached operational limits. Utility arms 306a, 306b and auxiliary arm 304 may be selected to move to a designated home position. In some embodiments, the selected robot arms may be moved to their associated home position based on selection of an arm home icon option. Furthermore, all robot arms (e.g., utility arms 306a, 306b and auxiliary arm 304) may be automatically moved to a working position and a roading position. The working position may be the home position ready for work or a designated position for the particular task to be performed. For example, individual icons may be provided to move left robot arms up, down, left, and right. Various distances may be programed as well. For example, utility arms 306a, 306b and auxiliary arm 304 may be programed to move 1, 2, 4, 6, 12, or any number of inches, which also may be selectable by operator.

In an exemplary scenario, operator 120 may select an automated task presented by an icon on VR interface 502. The automated task may be to couple a tool from tool rack 334 to right utility arm 306a. The automated task may initialize all robot arms to a starting position such that auxiliary arm 304 and left utility arm 306b are out of the way of expected movement of right utility arm 306a. In some embodiments, the positions may be calculated based on home positions, known distances between components in work environment 400, or based on virtual fences described below. In some embodiments, operator 120 may also select a home-for-all icon that moves all arms to home positions and select a tool change position icon that moves right utility arm 306a to the tool change position. In some embodiments, selection of a tool change icon may perform all tasks described above.

In another exemplary scenario, operator 120 may select a road position icon. The roading position may be a storage position for aerial robot system 300. Aerial robot system 300 and component thereof may move to positions ready for boom assembly 104 to be lowered and stored for travel.

In some embodiments, motion settings icon 562 may be presented on main menu 540. Selection of motion settings icon 562 may provide various submenu selections for controlling the motion of utility arms 306a, 306b and auxiliary arm 304 as well as any other components of aerial device 100. It some scenarios, it may be advantageous to restrict the movement of parts of aerial device 100. For example, linear and rotational motion may be restricted, prevented, or allowed based on any motion settings submenu icon selection. For example, motion settings icon submenu may provide a tare override icon selection option. The tare override option, when selected, may zero the tool rotation preventing the tool from rotating when the robot is enabled and commanded to move. Any robot and tool movement restrictions and allowances may be activated by the motion settings.

In some embodiments, task selection is provided by task selection icon 564 and task selection submenu. The task selection options provide various stored tasks to be selected for populating flyout menu 534 with associated flyout menu icons 584. The associated flyout menu icons 584 may provide task-associated tools and selectable automations for performing automated tasks. Exemplary automated tasks may be, as described above, replacing a suspension insulator, a pin, or a tension insulator, or connecting or disconnecting a jumper, changing tools for each task, as well as many more options associated with maintenance and replacement of power and telecommunication line components. Selection of any one of the menu/submenu items associated with task selection icon 564 may automatically update flyout menu 534 with all selections to retrieve the needed tools and the needed automations to complete the associated tasks. Flyout menu 534 comprising flyout menu icons 584 is described in detail below.

In some embodiments, when remote assembly 202 is activated, a null task is presented representing no task under the current task menu 524. As such, there are no current tasks in operation or queued for operation. In some embodiments, the most recent performed or queued task is uploaded such that the most recently updated flyout menu 534 is displayed. In some embodiments, a next task in queue is automatically uploaded. Furthermore, a previous option may be provided by task selection icon 564 menu and/or submenu such that the most recent task is again uploaded, and the associated flyout menu 534 items are provided for selection. Further still, in some embodiments, a practice option may be provided by task selection icon such that operator 120 may select and run through a practice simulation for each task prior to performing the tasks live.

In some embodiments, automation interrupts icon 566 may be provided on main menu 540. When automation interrupts icon 566 is selected an automation interrupts submenu may be presented for selection by operator 120. Operator 120 may select various icons instructing and controlling various components of aerial device 100. Automation interrupts may provide selectable icons by automation interrupts submenu for controlling the running of operational script controlling the various components of aerial device 100. For example, automation interrupts may control the start, stop, pause, and resume of automation script. This allows operator 120 to stop and restart any automation of aerial device 100. The automation of aerial device 100 is described in detail below.

Furthermore, in some embodiments, automation interrupts menu icons may be provided based on the state of aerial device 100 and components thereof. In an exemplary scenario, an automation, such as the tool exchange described above, may be the current task and in current operation. As such, continuing with the example provided above, right utility arm 306a may be reaching for a tool exchange at tool rack 334. A start automation icon or resume automation icon may not be available or may not be displayed as the task is already underway. In some embodiments, a function that is not available may be displayed as a different color indicating that it is not available or may not be presented by VR interface 502. Furthermore, an available function may be associated with a displayed or differently colored displayed icon. For example, stop automation or pause automation may be selectable by associated stop automation icon and pause automation icons represented as illuminated, a red or green color, or may be bordered or highlighted. Any indication including any color may indicate that an associated icon function is available or not available and the indication may be customizable by operator 120.

In some embodiments, virtual fences are provided to prevent contact between components of aerial device (e.g., utility arms 306a, 306b, auxiliary arms 304, 366, bonding unit 424, etc.). Generally, virtual fences may act as artificial barriers that components cannot cross and, in some embodiments, may provide haptic feedback by input devices 122 and display alerts by VR interface 502.

In some embodiments, virtual fences may be automatically generated near or around specific components; however, virtual fences may also be placed by operator 120 utilizing pointer as shown in pointer 534b in FIG. 5B. Here, selection of virtual fence icon 568 may provide a submenu with selectable icon features for showing/hiding virtual fences displayed by VR interface 502. Furthermore, icon options may be available to add/subtract virtual fences as well as energize, ground, and clear all stored virtual fences. These options are exemplary, and any management of virtual fences may be performed by various icons presented in a submenu upon selection of virtual fence icon 568.

In some embodiments, settings may be accessed by operator 120 selecting settings icon on main menu 540. Main menu 540 may provide settings icon 570 that, when selected, may provide a settings submenu comprising various icons for selection by operator 120. In some embodiments, various settings for aerial device 100, VR interface 502, input devices 122, and the like may be accessed and controlled. In some embodiments, aerial robot system 300 component relative to work environment 400, or the environment of virtual reality may be calibrated. A selection of a visuals icon may provide a sub or sub-sub menu providing selections for calibration and control of settings of various components and visuals of aerial device 100 including VR interface 502. For example, in some embodiments, camera settings of camera 212 may be accessed and controlled. The camera settings may designate which cameras are used and which cameras are added to quick menu 506 described below. In some embodiments, connect/disconnect of camera 212 (e.g., robot camera 426) may be selected. Each camera and/or all cameras may be moved, selected, connected, and disconnected, based on overcoming various locking features described below. Furthermore, each camera of cameras 212 may be individually accessed for fine tuning camera features. Camera features may include brightness, converge, and zoom. In some embodiments, carious automated converge features may be implemented. Here, it should be noted that operator 120 may set any convergence and zoom instructions, and any values described herein are exemplary only. For example, a converge value of 0.7 may be selected. Here, robot cameras 426 may move such that a focal point of each camera's field of view may be 0.7 meters from the robot head. In other words, a line extending outward along a focal path of each camera may converge at a point 0.7 meters from the lens/shutter of each lens of robot camera 426. Similarly, selection of converge 1.0 may move the focal point to 1.0 meters, then selection of converge 2.0 may move the focal point to 2.0 meters, and so forth. Any focal length limited only by the cameras used may be imagined. Convergence of the cameras allows the cameras to focus on objects at various distances from the cameras reducing the strain on operator 120 to see objects in the field of view.

Furthermore, in some embodiments, camera zoom may be controlled by operator selecting various icons displayed by the settings menu/submenu or settings-camera sub-submenu accessible by selection of settings icon 570. In some embodiments, zoom icons may be displayed and may be selectable by operator 120. Automated zoom settings may be stored and associated with each zoom icon. For example, zoom settings of +1×, +1.5×, +2×, and the like may be stored and applied when operator 120 would like to see objects closer. Similarly, or alternatively, the zoom may be set to 0.95 for objects that appear closer than they are, 0.75 to increase the field of view, 0.50, and the like. The zoom settings described herein are exemplary and customizable by operator 120 and accessible by selection of settings menu icon 570.

In some embodiments, orientation of the camera video may be modified by operator selecting a camera render icon also presented upon selection of settings menu icon 570. The camera render icon may provide a camera render sub menu with selectable options for operator 120 to modify camera video/image render settings. For example, an enable render flip setting may render the video feed 504 in an upright position. The upright feed may be used when robot camera 426 is above a wrist of utility arms 306a, 306b. Alternatively, a disable render flip setting may render video feed 504 in an upside-down, or an orientation inverted from the real video taken by robot camera 426. The inverted video feed orientation can be useful when robot camera 426 is below the wrist of utility arms 306a, 306b.

In some embodiments, an enable stereo option provided by selection of settings menu icon 570 enables stereo vision of a plurality of cameras of cameras 212. Any field of view of any cameras can be used to project 3D vision in the virtual reality environment (i.e., by VR interface 502). In some scenarios, the stereo vision may be default. A return to default settings selection may be used to return to stereo if the camera settings are stuck in mono-vision. Similarly, or alternatively, enable mono left/right may turn off stereo vision and project left-camera-only/right-camera-only features by VR interface 502. All camera settings for cameras 212 may be selectable in a camera submenu to main menu accessible by selection of settings menu icon 570.

In some embodiments, main menu 540 may provide an advanced settings icon 572 option. Selection of advanced settings icon 572 may provide a submenu of selectable icons that, when selected, control operation of some components and interlocks of aerial device 100. For example, selectable advanced settings icons provided by submenus and sub-submenus may include the functions of enabling and disabling of freedrive. Freedrive, in some embodiments, is an automated action where aerial robot system 300 can move rotationally and positionally to achieve an unloaded state. In some scenarios, safeguards electrically disconnect aerial robot system 300, utility arms 306a, 306b, auxiliary arm 304, tools associated with each arm, and other various components. The electrically disconnected components may be electrically reconnected by selecting various connection icons presented in the advanced settings menu/submenu accessible by selection of advanced setting icon 572.

In some embodiments, load safeguards and estimated load expectations may be adjusted in advanced settings submenu presenting submenu icons and accessible by selection of advanced settings icon 572. For example, operator 120 may input an expected load; however, as aerial robot system 300 lifts the load, safeguards based on expected load and robot orientation may prevent aerial robot system 300 from lifting the load. Knowing that the load is well within the limits of normal operation of aerial robot system 300, operator 120 may access advanced settings menu and adjust load settings by adding weight to the expected load and/or resetting the expected load value. Upon update of the expected load value, aerial robot system 300 may then be controlled to lift the load, or an automation may be initiated by operator 120 to lift the load.

In some embodiments, advanced settings menu may provide selectable icons initiating automated movements of aerial robot system 300 and components thereof. Furthermore, operation modes of aerial device 100 may be activated. In some embodiments, operator 120 may activate front or rear facing mode of aerial robot system 300 by selection of advanced settings icons. Here, aerial robot system 300 may automatically rotate 180 degrees to face forward (working direction shown in FIGS. 3 and 4) or backward toward tool rack 334. Furthermore, advanced settings menu may provide selections to change the priority of wrist inverse kinematics depending on the tool used. In some embodiments, selection of a tool, as described in detail below, may automatically result in the operation priority change.

In some embodiments, VR interface 502 may display errors associated with aerial device 100 including computing systems and any detected mechanical problems. As described above, in some scenarios, a load may be detected as too high or a geometry of aerial robot system 300 may be near operational limits based on the load. Furthermore, as described in more detail below, electrical leakage may be continuously monitored and indicated by VR interface 502. After detection and notification, any errors may be resolved by operator 120. Once these errors are resolved, an advanced settings option may be selected to clear all errors displayed via VR interface 502. Furthermore, any interlock systems that were initiated based on the errors may be manually or automatically released.

In some embodiments, various poses of aerial robot system 300, auxiliary arm 304, and any other components of aerial device 100 may be exported to and displayed by VR interface 502. Any data associated with boom assembly 104, aerial robot system 300, and auxiliary arm 304 orientation and loading as well as tools used, tools stored, and the like may be displayable by VR interface 502 upon operator selection of various icons 522. Furthermore, any of the components and orientations may be calibrated utilizing selectable inputs of the advanced settings menu accessible by selection of advanced settings icon 572. For example, tool changer calibration may be controlled by automated actions initiated by selection of a tool icon associated with the advanced settings submenu. Tool slot location calibration may be performed based on views of camera 212 and detection of components by object recognition or by object indicia recognition. Furthermore, short-range communication tags disposed on the tools, as well as any other sensor data may be used to locate tools stored on tools rack 334 and recognize locations (e.g., tool holders 336) on tool rack 334 again by object recognition or indicia recognition indicating each slot of tool rack 334 and/or the tool in a tool holder. Upon selection of an associated icon by operator 120, aerial robot system 300 may enable an automation and follow a preprogrammed or user-commanded tool location and calibration process. Furthermore, the calibration may be tested by a similar icon selection process. Additional automated processes may be initiated to test the calibrated locations of tools to verify that the calibration is correct.

Furthermore, in some scenarios, remote assembly 202 may freeze, lose memory, lose network communication, or the like. Furthermore, operation of any components of aerial device 100 may be manually or automatically halted for unknown reasons. In this case, cameras 212 may be initialized as a tool.

In some embodiments, any information displayed by VR interface 502 and input into remote assembly 202 may be applied in various languages. The languages available may be displayed by a submenu to main menu 540 accessible by languages menu icon 574 and may be selectable to change all displays and audio in the language selected.

Any of the above-described main menu icons and associated submenu icon options may be added to quick menu 506 described in detail below. The main menu icons may be displayed in any order and may be customizable by operator 120 and/or any administrator of control system 280. Furthermore, the various icons 522 displayed are only a small selection of examples. The menus and submenus described are generally extendable to any displayed icons 522. As such, there is no limit to the number of menus and submenus displayed by VR interface 502 with each menu and submenu providing icons selectable by operator 120 to initiate automated functions of aerial device 100 described herein. Furthermore, the displayed icons may be any graphical representation of the associated functions, and each menu and submenu may be customizable by operator 120.

Turning now to FIG. 5B, VR interface 502 comprising video feed 504 and overlaid interface graphics (e.g., flyout menu 534) is displayed. In some embodiments, flyout menu 534, also known as tools menu and/or automations menu, provides task-specific functionality by selection of flyout menu icons 584. Flyout menu 534 may be provided on VR interface 502 in any location customizable by operator 120. For example, operator 120 may move flyout menu 534, or any other menu, in real time by simply grabbing and moving to a different location using VR interface curser or simply grab and pull. Furthermore, flyout menu 534 may be accessible by simply selecting inputs 512 on input devices 122. For example, a button input of inputs 512 may be pressed to select flyout menu 534. Once pressed, a first option of flyout menu 534 (e.g., Pin Puller Pusher Side 534a) may be highlighted, colored, or displayed as a different size. Operator 120 may then use thumb controls or various other inputs to scroll through the various options available by flyout menu 534.

Flyout menu 534 may depict various tools available to aerial robot system 300 and auxiliary arm 304 as well as various automations that may be performed by aerial robot system 300, auxiliary arm 304, and any other components of aerial device 100. As described above, operator 120 may access flyout menu 534 and select any of flyout menu icons 584 displayed and representing various tools and automations. Flyout menu 534 displayed by VR interface 502 provides these various functions to operator 120 in a quick, easy to use, and user-understandable display.

In some embodiments, flyout menu 534 provides access to various tools. For example, as shown in FIG. 5B, flyout menu icons 584 comprise pin puller pusher side 534a, pointer 534b, robotiq85 534c, pneumatic gripper big 534d, pneumatic gripper flat 534e, and pin pusher puller front 534f. Flyout menu icons 534a-534f comprise various tool selection icons that, when selected, initiate automation to select the tool associated with the selected icon from the associated tool holder 336 of tool rack 334.

The tool icons 534a-534f shown here are exemplary and any icon for any tool that may be stored in tool rack 334 and accessible by aerial robot system 300 may be provided by VR interface 502. Selection of each tool icon of tool icons 534a-534f may provide automation for acquiring each tool from tool rack 334 by aerial robot system 300, and each tool may provide a specific function. For example, a pin pusher puller side tool may be configured to pull and push pins that are on the left or right of hardware in the work environment 400. A pointer tool may be an electrically insulated tool for selecting points for the virtual fences described above. Robotiq85 may be configured as a general utility gripper that may be useful in gripping non-specific items. Pneumatic gripper big may be configured to grip under pneumatic power for grabbing broken suspension insulators. Pneumatic gripper flat may be configured to provide a higher gripping force than pneumatic gripper big and may be utilized for general gripping of non-specific items. Pin pusher puller front may be configured to pull and push pins that are disposed on the front or back of hardware or otherwise 90 degrees or orthogonal to the pins available to pin pusher puller side. In some embodiments, a u-hook tool may be used as a dielectric hooking tool to lift tension insulators when tension is removed from lines. It should be noted that the various tools described herein are exemplary and common-use tools that may be readily available in the industry; however, various other tools that may be configured for use by aerial robot system 300 and auxiliary arm 304 and may be stored in tool rack 334 may be used. Furthermore, all tools described herein may be associated with tools icons 534a-534f and when tools icons 534a-534f are selected, automation may be initiated to control aerial robot system 300 to retrieve the tools from, and place the tools on, tool rack 334 in their respective calibrated locations.

Furthermore, as shown in FIG. 5B, flyout menu 534 may comprise various selectable function icons 534g-534k configured to initiate available task-specific automations that may be implemented by the tools listed above and provided by tools icons 534a-534f. As shown, the function icons 534g-534k, when selected initiate automations comprising replacing a suspended insulator, grasping the suspended insulator, grasping a phase extension, object disposal, grasping a suspension insulator helper, and any other automated tasks/subtasks that may be necessary to complete the associated work task. Selection of an icon of function icons 534g-534k may initiate the respective operations. For example, selection of replace suspension insulator icon 534g initiates automation comprising executing computer-implemented instructions to place an old insulator into receptacle 324 and retrieve a new insulator from parts holder 338 of tool rack 334. Selection of grasp suspension insulator icon 534h may comprise automation to retrieve the new replacement insulator from parts holder 338. Grasp phase extension 534i may automate retrieving phase extension rod 536 when dropping phase 408. Object disposal icon 534j may dispose of an object in receptacle 324 that is currently held by aerial robot system 300 or auxiliary arm 304. Grasp suspension insulator helper icon 534k may automate grasping a wedge used to retain large conductor hardware.

Furthermore, as described above in relation to main menu 540, flyout menu 534 may comprise a flyout submenu 586 that is displayed when a flyout menu icon is selected. Here, replace suspension insulator icon 534g is shown as slightly larger than the other flyout menu icons 584. The larger size is indicative of selection of replace suspension insulator icon 534g and display of flyout submenu 586. Furthermore, flyout submenu icon (e.g., utility arm icon 590) is larger indicating selection. As described above, indication of selection and highlighting may include additional colors, borders, sizes, shapes, and the like.

In some embodiments, quick menu 506 may be displayed by VR interface 502 as shown in FIG. 5B. Quick menu 506 may display various selectable control features associated with inputs 512 on input devices 122. In some embodiments, the various selectable control features may be displayed on VR display 500 as shown. Each control feature may represent a different selectable automation or general control configured for scrolling through menu options on various menus (e.g., main menu 540 and flyout menu 534). Here, four exemplary virtual controls are displayed; however, in practice, only one or two will be displayed each visually representing left hand controls 508 and right hand controls 510.

In some embodiments, quick menu 506 comprises left hand controls 508 and right hand controls 510 indicative of various selections available to operator 120 in this exemplary scenario. Right hand controls 508 are operated similarly to left hand controls 510 and quick menu 506 is updated with inputs from operator 120 similarly as described in relation to left hand controls 508 described herein. Here, left control icons 576a, 576b presents left central indicia 580 indicative of left pad 518 and positions thereof. As operator 120 revolves their thumb around left pad 518 or selects various locations of left pad 518, each icon of left control icons 576a, 576b associated with each selected location may be highlighted. Highlighting each icon of left control icons 576a, 576b, indicates to operator which icon is highlighted for selection. Operator 120 may then select the highlighted icon by again selecting the associated position of left pad 518 or by pressing any other input on left hand control 514. Upon selection of any of left control icons 576a, 576b, the associated automation of aerial device is initiated.

Display of quick menu 506 provides immediate visual feedback to operator 120 such that operator 120 may see actions and movement of aerial device 100 on video feed 504 in real time along with operator selections and options on quick menu 506 simultaneously. Quick menu 506 may be configured with any icons associated with any automations of aerial device 100 including aerial robot system 300, auxiliary arm 304, alternate auxiliary arm 366, and any other component of aerial device 100. Quick menu 506 may be displayed while operator 120 is operating equipment and/or while operator 120 is in VR interface 502 selection mode selecting controls and modes of aerial device 100.

In some embodiments, quick menu icons 582 may display various selections. The quick menu icons 582 may comprise, in some embodiments, automation interrupt icons such as stop script, stop all scripts, pause script, and play script (e.g., right control icons 578b). As described above the automation interrupt icons allow operator 120 to immediately control currently running automations. Furthermore, common quick menu functions are shown by the icons displayed in left control icons 578b in FIG. 5B comprising, starting from the top in clockwise order, tare override, next, enable admittance, and toggle instructions. In some embodiments, the quick menu icons 582 shown here may be automatically uploaded to quick menu 506. Tare override may provide the automated function of zeroing the rotation of any tool in any utility arm 306a, 306b, and auxiliary arm 304 locking movement. Preventing movement of the tool allows the arm (e.g., utility arms 306a, 306b, and auxiliary arms 304, 366) to rotate for working alignment rather than rotating the tool. Selection of the next icon moves the automation to the next task while using meta scripts. Meta scripts are described in more detail below. Selection of the enable admittance icon turns on admittance control. Admittance control places control in the hands of operator 120 by minimizing automated protective stops. Here, admittance control allows the arms to bump into objects without attempting to go through the objects by implementing limited protective stops. Protective stops prevent arms 306a, 306b, and auxiliary arms 304, 366, as well as any other movable components from pushing into the objects. Selection of toggle instruction icon toggles meta script instructions on and off.

In some embodiments, selection of a task, which is described in detail below, may automatically populate various menus. In some embodiments, quick menu 506 may automatically be populated based on the selected task from a task menu. For example, as shown in FIG. 4, meta script may display the task of "raise/lower auxiliary arm." Auxiliary arm 304 is lifting phase 408 such that the phase 408 can be moved up or down and out of the way of robot unit 302. Because the sequence of sub tasks for the current tasks are stored and known, a quick menu button for switching to auxiliary arm 304 operation may be provided. Furthermore, a single selection to move auxiliary arm up or down may be provided to quick menu 506 based on the task that is currently performed.

The quick menu 506 may be updated in real time after each task. In some embodiments, quick menu 506 may provide four selections relating to the first four sub tasks. For example, quick menu 506 may provide selections for automating grasping of a tool, placing the tool in position, grasping an insulator, and automated removal of the insulator. When all sub tasks are complete, quick menu 506 may then be updated with the next four tasks—for example, initiation of automatic placing the insulator 404 in the receptacle, initiation of automation of changing tools, initiation of retrieving a new insulator, and initiation of moving the new insulator in position for placement. Any of the above-described tasks operable by automations and selection of associated icons may be performed by automation or by operator 120. In some embodiments, operator 120 may be notified by VR interface 502 that a task does not include automation or that the automation cannot be performed because of irregularities in the work environment 400 and that operator 120 must perform the tasks manually.

In some embodiments, VR interface 502 may display various notifications and information indicative of the state of robot system 300. As described above, admittance control places control in the hands of operator 120 by minimizing automated protective stops. Here, admittance indicator 526 is displayed as being temporarily disabled as robot system 300 is in a state where protective stops are desired over admittance control. For example, right utility arm 306a may be controlled to cross left utility arm 306b by operator 120, but a protective stop may automatically stop movement if utility arms 306a, 306b, contact. Admittance indicator 526 notifies operator that admittance control is on/off and, in some embodiments, some controls may be limited based on the state of admittance control.

Furthermore, notification screen 592 may display any errors associated with operator inputs, malfunctions of robot system 300, and the like. Here, notification screen 592 is indicating that operation of right arm (right utility arm 306a) is paused because an interlock foot pedal is not pressed. As such, operator 120 must press the interlock foot pedal to allow operation of right utility arm 306a. Here, notification screen 592 provides instructions to operator 120. As such, notification screen 592 may also be, or be associated with, coach screen 616 described below.

Operator Coach

Generally, embodiments of the disclosure relate to providing steps, instructions, and user-initiated or step-initiated automation to assist in the work-related tasks in work environment 400 as described above. In some embodiments, VR interface 502 causes display of menus comprising selectable features for controlling operation of remote assembly 202 as described above. VR interface 502 may provide a step-by-step procedure list for completion of the tasks. In some embodiments, each step in the procedure list may comprise instructions for performing the associated step. These steps and instructions may be provided by meta scripts 618, 620 and coach screen 616 presented by VR interface 502.

Figure 6A:
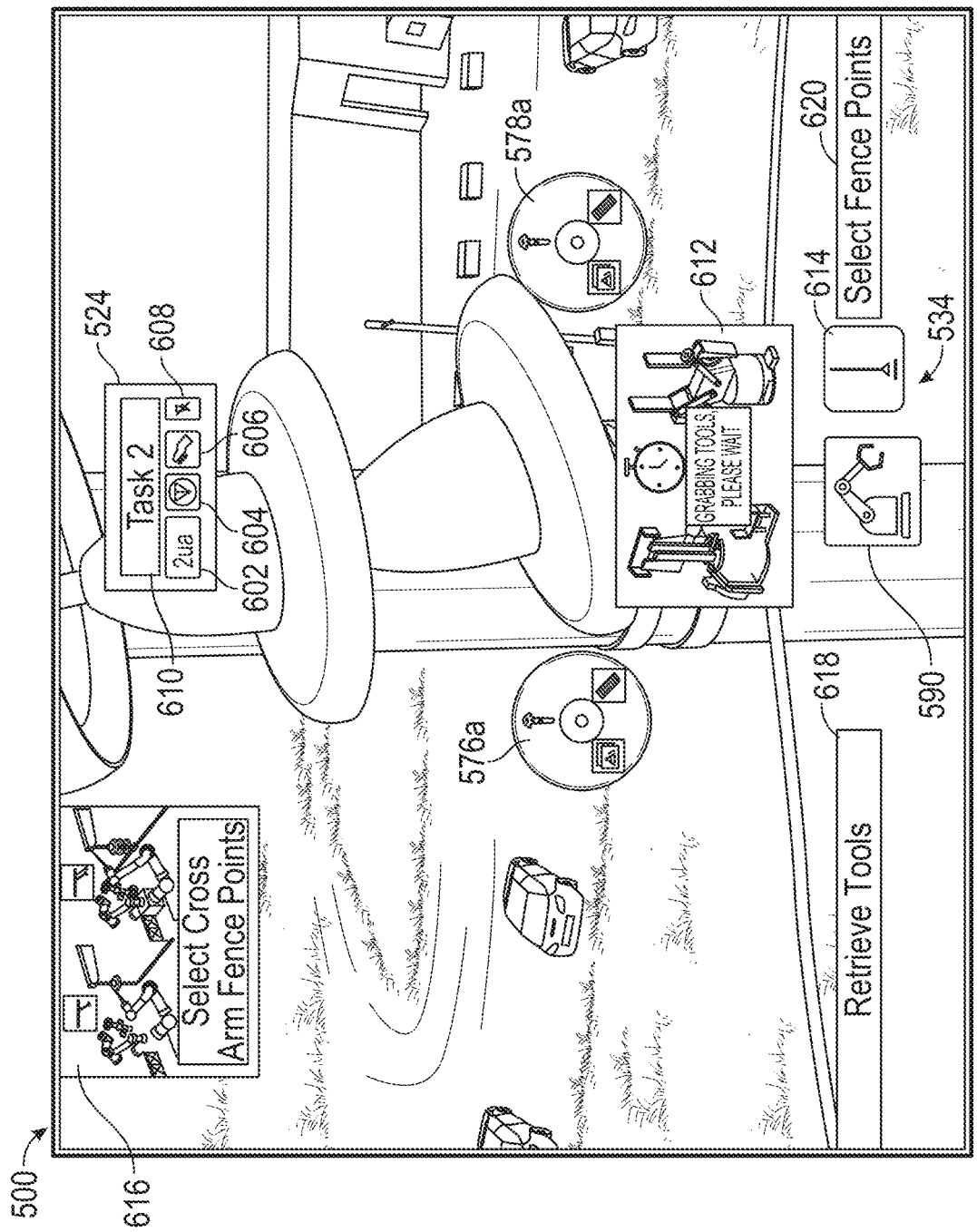
FIGS. 6A and 6B depict the virtual reality interface providing a flyout menu and coaching operations for some embodiments.
Figure 6B:
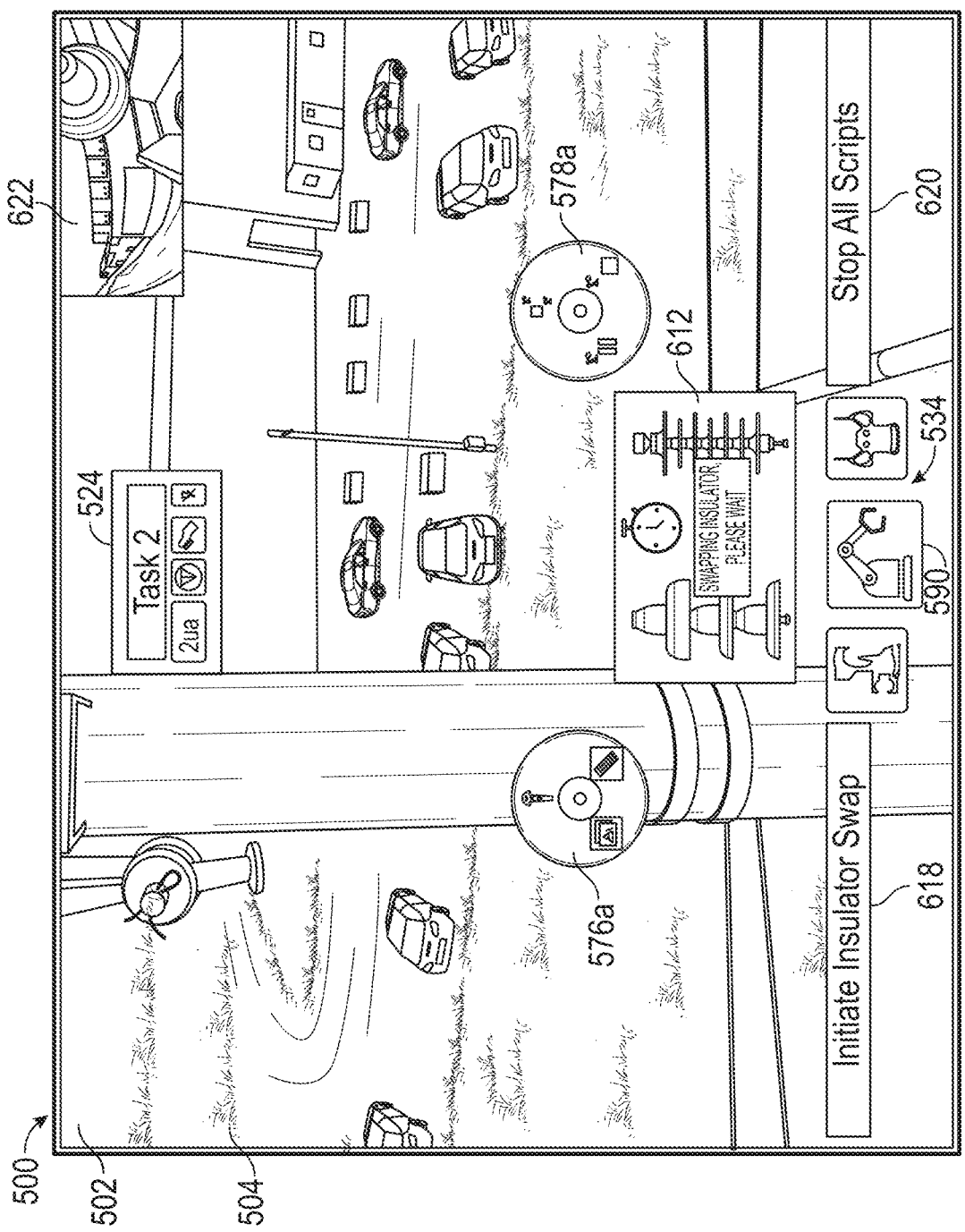

FIGS. 6A-6B depict an exemplary embodiment of VR interface 502 providing various menus and icons for providing an operator assistant or "operator coaching assistant" for operator 120. FIG. 6A depicts an embodiment of VR interface 502, illustrating an exemplary operator coaching assistant function of remote assembly 202. In some embodiments, operator coaching assistant comprises computer-executable instructions provided by the combination of control system 280 and computer 260 providing VR interface 502 and control functions (e.g., automations) and operation instructions to operator 120 and remote assembly 202. Operator coaching assistant, in some embodiments, assists operator 120 in performing tasks using VR interface 502 by providing various menus and indications by VR interface 502. In some embodiments, task menu 524 may be provided such that operator 120 is aware and can verify that the correct task is being performed. Furthermore, task menu 524 may present various state information indicative of the state of aerial device 100 and the components thereof such that operator 120 is aware of the current state of robot system 300. Here, task menu 524 presents Task 2. Task 2 may represent a general task such as, for example, changing a faulty insulator as described above, or may be a specific task such as, for example, retrieving pin puller pusher side described above. A task number may be displayed (e.g., Task "2"), or a title of the task may be displayed (e.g., "retrieving pin puller pusher side"). Furthermore, task menu 524 may also represent the state of aerial robot system 300, and a state of cameras 212 of robot unit 302. For example, task menu 524 may be display with a color or bordered in a color that represents the state of the current task. For example, task menu 524 may be green when cameras 212 and aerial robot system 300 are active, yellow when paused, and red when inactive. The color arrangement here may also apply to any icon and indicium described herein. In some embodiments, the green, yellow, and red color system may be generalized to represent in operation, paused, and stopped for any icon associated with any tool, component of robot system 300, and any function.

In some embodiments, task menu 524 may display various icons representing the state of aerial device 100 associated with the current task. In some embodiments, a VR controller battery power level indicator (not shown) or an estimated time until VR controller loses power may be displayed. The battery power and time indicator may represent the time left for operator 120 to operate aerial device 100. Furthermore, various other icons such as, for example, camera/robot state indicator, boom leakage current indicator 602, E-stop state indicator 604, foot pedal state indicator 606, bond state indicator 608, task indicator 610, as well as any other indicator representative of the state of aerial device 100 may be displayed. Boom leakage current indicator 602 may display the amount of current detected across the dielectric gap separating the work environment 400 from the base of aerial device 100. Here, an exemplary 2 microamps is displayed. E-stop state indicator 604 displays the current state of e-stops (e.g., electric interlocks). Various indicators may represent the state of the e-stops. For example, if an e-stop is engaged e-stop state indicator 604 may be red and enlarged. Alternatively, if no e-stop is engaged, e-stop indicator 604 may be green, black, or no indicator may be displayed. Any indication representing the state of e-stops may be imagined.

Figure 7:
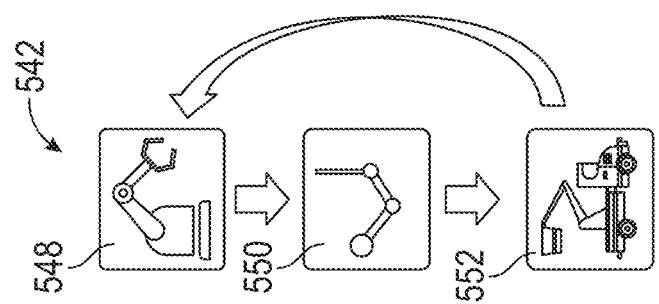
FIG. 7 depicts an exemplary foot pedal input.
Figure 7:
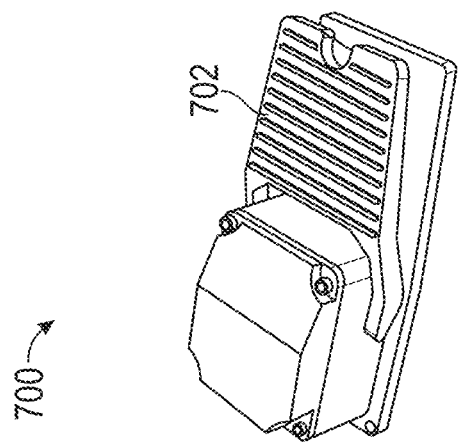

In some embodiments, task menu 524 may comprise foot pedal state indicator 606 may display a state of the foot pedal 700 (FIG. 7). For example, foot pedal state indicator 606 may be displayed with a red or yellow indicator, or border, when not pressed and a green indicator when pressed. Foot pedal 700 pressed or not pressed may be configured to change modes of aerial device 100 as described in detail below in reference to FIG. 7.

Furthermore, task menu 524 may include bond state indicator 608, which may represent the state of bonding between aerial device 100 and electrical lines (e.g. phase 408). Here, bond state indicator 608 and/or color of bond state indicator 608 may represent a state of bonded (e.g., green) or not bonded (e.g., red) indicative of aerial device 100 bonded to phase 408. As such, operator 120 may always be aware of the bonded state of aerial robot system 300.

In some embodiments, a current automation may be displayed by automation screen 612. Automation screen 612 may convey to operator 120 that automations are currently active and in operation and which automations are currently active and in operation. As shown in FIG. 6A, the current automation is "grabbing tools." The tools here may have been selected by operator 120 or automatically selected based on the current task (e.g., Task 2) displayed on task indicator 610. As an automation is currently in operation, all, or most, manual operations may be locked as aerial robot system 300 moves utility arms 306a, 306b to retrieve tools from tool rack 334. Therefore, automation screen 612 indicates and illustrates the automation currently taking place as well as locking out operator 120 from performing tasks, in some scenarios. In some embodiments, operator 120 must wait until the automation is complete to take back control of aerial robot system 300; however, in some embodiments, the automation may automatically pause and request action from operator 120 as described below. Furthermore, automation screen 612 may also display various icons indicating which components of aerial device are in operation and which tools are currently being retrieved from or placed on tool rack 334.

Furthermore, when the automation is complete, automation screen 612 may change to indicate that the state of aerial device 100 is in condition for takeover by operator 120. For example, automation screen 612 may turn green or may display various signs such as, "automation complete," "operator control," or the like. In some embodiments, automation screen 612 is simply no longer displayed on VR interface 502, and operator 120 has been instructed that no display means that the automation is complete.

Furthermore, as shown in the exemplary embodiment depicted in FIG. 6A the active components of aerial device 100 may also be displayed. Here, utility arm icon 590 is displayed indicating that one of utility arms 306a, 306b is currently performing automated operation (e.g., "grabbing tools"). Current meta script 618 is displayed reciting "Retrieve Tools" as the most recent request from operator 120. In some embodiments, a single meta script may be displayed indicating the most recent operation, or the current operation. In some embodiments, several meta scripts may be displayed, as described below.

Furthermore, in the exemplary scenario depicted in FIG. 6A, alternate auxiliary arm icon 614 is also displayed to indicate the next component needed for the next action up in the sequence of events for the current task (e.g., "Task 2"). Also, next action meta script 620 is displayed providing operator 120 with the next action that will take place during the automation or any next actions that operator 120 must take to initiate the next action for Task 2. Here, VR interface 502 is causing display of coach screen 616 in the upper left-hand corner of VR display 500, providing next action meta script 620, and indicating the next tool that is required by displaying alternate auxiliary arm icon 614. Here, three indications are displayed; however, any number of the indications may be displayed, which may be customizable by operator 120. As such, meta scripts (e.g., current meta script 618 and next action meta script 620) display the sequence of actions that are taken by both operator 120 and aerial device 100 to complete Task 2.

In some embodiments, after the current action (e.g., grabbing tools) is complete, the next action is displayed (e.g., select fence points). As operation of the next action is requested from operator 120, all automation scripts may pause waiting for operator 120 to perform the next action. Here, coach screen 616 is requesting operator 120 to select a location for setting virtual fences using alternate auxiliary arm 366 and the pointer tool. Once operator 120 has selected virtual fences the automation may move on to the next action in the sequence of Task 2 automatically or by initiation by operator 120.

FIG. 6B depicts an embodiment of VR interface 502 providing video feed 504 from a forward-facing camera, which in some embodiments, may be robot camera 426. Various VR interface features may also be displayed including flyout menu 534 depicting various tools for use with Task 2 including the current utility arm icon 590 as selected. Furthermore, current task menu 524, left hand icon 576a, right hand icon 578a, and current automation screen 612 listing the current automation "swapping insulator." Therefore, utility arms 306a, 306b may currently be running an automation to place an old or broken insulator into waste receptacle 324 and retrieve a new insulator from parts holder 338.

In some embodiments, secondary display 622 displays video from camera 212, which, in this scenario, may be different than video feed 504. As shown here, during the current task of swapping the insulator, the video displayed by secondary display is provided from a camera of cameras 212 associated with utility arms 306a, 306b, and/or tool rack 334. As such, operator 120 can monitor the progress of the automation while still viewing work environment 400 by video feed 504. Secondary display 622 may automatically be displayed or may be initiated by operator 120. In some embodiments, initiation of secondary display 622 is customizable by operator 120 and may be added to quick menu 506 for to activate and deactivate by selection of an input by input devices 122. Furthermore, as secondary display 622 shows the view of an automation, all or some controls may be locked such that operator 120 cannot move components of aerial device 100, as described above. E-locks prevent operator 120 from moving components during an automated task and prevents distractions. During automated tasks some or all components of aerial device 100 may be locked to operator 120 such that the automated task may be stopped by operator 120 before operator 120 can take over any tasks. In some embodiments, operation of components may be limited or only some operation may be locked.

FIG. 7 depicts foot pedal 700 operable by operator 120 for selection of various modes of operation of aerial device 100. In some embodiments, foot pedal 700 may present a quick and intuitive method of switching modes of aerial device 100. For example, as shown, three modes may be selected indicated by the displayed icons-utility arm icon 548, utility control Cartesian icon 550, and boom Cartesian control icon 552. The modes operable for selection here are exemplary and any operational modes of aerial device 100 may be selected by foot pedal 700. In some embodiments, the operational modes selectable by foot pedal 700 are customizable such that operator 120 may choose from any operational modes, automations, tasks, and actions described herein.

In some embodiments, as operator 120 presses foot pedal 700, each successive icon may be illuminated, change color, highlighted, bordered, or any other indicium representing selection of the icon. Operator 120 may then press foot pedal 700 selecting the operation mode indicated on the screen. In some embodiments, foot pedal 700 may be used in conjunction with an interlock pedal (not shown) or foot pedal 700 may act as an interlock as well, providing the E-locks described above. For example, when operator 120 lifts their foot off of foot pedal 700, aerial device 100 may apply E-locks, and components of aerial device 100 may be inoperable. As such, in some embodiments, foot pedal 700 must be pressed to operate aerial device in all or some modes. In some embodiments, when used with the associated interlock pedal, foot pedal may simply be used to select operational modes of aerial device 100. In some embodiments, the operational mode of aerial device 100 is automatically set in Cartesian mode; however, changing to joint mode (controlling each joint individually) may be selected in main menu 540 and may be selected by scrolling through various icons 522 by pressing foot pedal input 702 until utility control Cartesian icon 550 is highlighted. Operator 120 may then select utility control Cartesian icon 550 by pressing foot pedal input 702 again.

In some embodiments, foot pedal 700 may be a plurality of foot pedals and/or foot pedal 700 may comprise a plurality of inputs (e.g., foot pedal input 702 may comprise a plurality of foot pedal inputs). For example, foot pedal input 702 may comprise a first foot pedal input that when selected scrolls through optional icons while selection of a second foot pedal input selects the highlighted icon. In some embodiments, foot pedal 700 comprises sensors and a processor configured to detect force and time of the foot pedal input 702 being depressed. For example, operator 120 may tap foot pedal input 702 to scroll through various icons 522 and press and hold foot pedal input 702 to select the various icons 522. As such, foot pedal 700 may provide various functionality in association with controlling modes of aerial device 100 and selection of options by VR interface 502. Furthermore, the various functions provided by foot pedal 700 described herein may also be performed by inputs associated with operator 120, foreman operator 906, and any other crew members. The functions performed by foot pedal 700 may also be performed by selection of any buttons, switches, seat switches, and the like as well as features on VR interface 502.

In some embodiments, foot pedal 700 may comprise an interlock feature as described above. In some scenarios, the interlock feature must be engaged for automations to proceed and/or for operator 120 to perform manual tasks. As described above, automations may be initiated by operator 120. During the course of an automation, aerial robot system 300, for example, may be active indicating a green indicium on quick menu 506. Operator 120 may release foot pedal 700, thus engaging the interlock and pausing/stopping operations. As such, the green-colored indicator of quick menu 506 may turn to yellow indicating a paused operation or red indicating a stopped operation. Operator 120 may then press foot pedal 700 resuming the automation and the indicium again changes to green to shown that the operation has commenced. Furthermore, operator 120 may end automation and take control of the aerial robot system 300 at any point during automation.

Simulated Joysticks

In some embodiments, as described above, as input devices 122 move, aerial robot system 300 moves according to the positional movement of input devices 122. However, in some embodiments, motion of auxiliary arm 304, alternate auxiliary arm 366, and boom assembly 104, may be controlled utilizing velocity control rather than position. Furthermore, in some embodiments, first, second, third, and fourth order linear and nonlinear controllers may be utilized to provide smooth motion and jerk control. In some embodiments, a mode of input devices 122 can be changed to represent proportional velocity joystick controls. Here proportional velocity joystick controls provide three directions (e.g., x, y, z orthogonal directions in Euclidean space) at once with the base of the input devices 122 resting on the user's knees as shown in FIG. 8A.

Figure 8A:
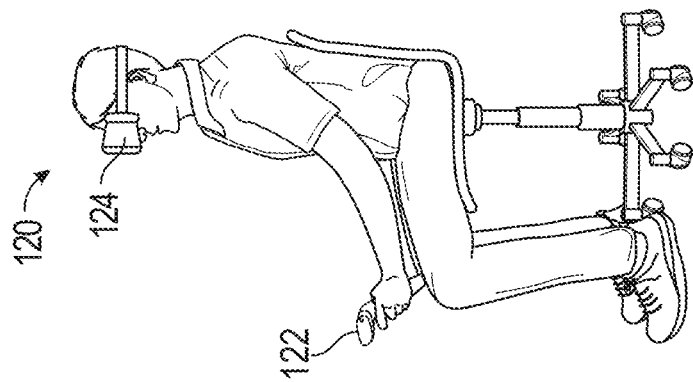

FIG. 8A depicts operator 120 sitting with input devices 122 resting on the knees of operator 120 providing a pivot point at the contact point between user's legs and the input devices 122. This operational mode allows operator 120 to operate input devices 122 as though the input devices 122 are connected to aerial device 100 as in typical models. As such, operator 120 may be more comfortable operating input devices 122 in the operational mode shown in FIG. 8A and described below. Furthermore, as depicted, input devices comprise left pad 518, right pad 520, and various left buttons 802 and various right buttons 806 as well as left trigger 804 and right trigger (not shown).

Referring now to FIGS. 8B and 8C, in some embodiments, when the user presses left trigger 804, a snapshot of the orientation of input devices 122 can be taken as a calibrated zero operation. The calibrated zero operation provides a baseline where all movement of input devices 122 can be detected by various sensors and relayed to the various processor and controllers (e.g., processor 282, controllers 284, processors 262) for controlling aerial device 100. Movement if input devices 122 from the calibrated zero point indicates intended movement of the selected component of aerial device 100 as shown in FIG. 8B where arrows indicating joystick dynamics for operation in Cartesian control mode example 808 and joint control mode example 810. Here, the term "Jib" is representative of auxiliary arm 304 and any alternate auxiliary arm 366 described herein. The term "Truck" is representative of boom assembly 104 in Cartesian control mode and joints of boom assembly 104 in joint control mode.

FIG. 8C depicts an exemplary embodiment where input devices 122 are utilized in Cartesian control mode for Cartesian inputs by respective left hand control 514 and right hand control 516 shown in Cartesian control mode example 808. FIG. 8C shows the mapping of left hand control 514 and right hand control to perform different functions when input devices 122 receive roll, pitch, or yaw compared to the above-described zero calibration point. Yaw is not shown, but it is imagined that yaw could be incorporated to provide functions of aerial device 100. Multiple directions can be input simultaneously in order to move in a direction that combines several Cartesian directions and/or components thereof. For example, when operator 120 pushes right hand control 516 forward and to the right (as shown) while engaging right trigger (not shown) jib (e.g., auxiliary arm 304) or truck (e.g., boom assembly 104) forward and to the right.

In another example utilizing joint mode as shown in joint control mode example 810, operator 120 may move left hand control 514 to the left rotating turntable counterclockwise while pushing right hand control forward extending upper boom section 110. Any combination of movements may be performed utilizing input devices 122 in Cartesian mode and joint mode. Furthermore, the inputs described herein are exemplary and may be customizable by operator 120.

Foreman and Operator

FIG. 9A depicts an exemplary jobsite 900 with a VR vehicle 902. In some embodiments, operator 120 is inside VR vehicle 902 operating aerial device 100. VR vehicle 902 may be connected by cable 904 providing wire communication to aerial device 100 for operating aerial device 100. In some embodiments, cable 904 may be a dielectric fiber optic cable providing electrical protection to operator 120 in the event that robot unit 300 becomes energized. Furthermore, the use of fiber optics, in some embodiments, provides greater communication range than standard copper wire communications. Here, VR vehicle 902 is exemplary and representative of operator 120 operating aerial device 100 from a remote location. It should be noted that operator 120 may be positioned on aerial device 100, on the ground near aerial device 100, at a specifically designated VR site (e.g., VR vehicle 902), or in a remote office that could be miles away. Furthermore, communication between operator 120 and aerial device 100 may be provided by cable 904 or wireless communication such as short-range communication, local area network, and/or wide area network.

In some embodiments, before operator 120 can take control of aerial device 100, foreman operator 906 may perform a set up process with or without the assistance of operator 120. In some embodiments, foreman operator 906 may assess jobsite 900 and verify that the conditions are appropriate for work to commence. The jobsite preparation process is described in detail below in reference to FIG. 11. Here, foreman operator 906 may provide a different perspective than what can be seen utilizing cameras 212. As such, foreman operator 906 can see if conditions change outside of the field of view of cameras 212. At any point, foreman operator 906 may stop movement of aerial device 100 and take over control of aerial device 100 as described below. Foreman operator 906 may control aerial device 100 using control box 908.

Figure 9B:
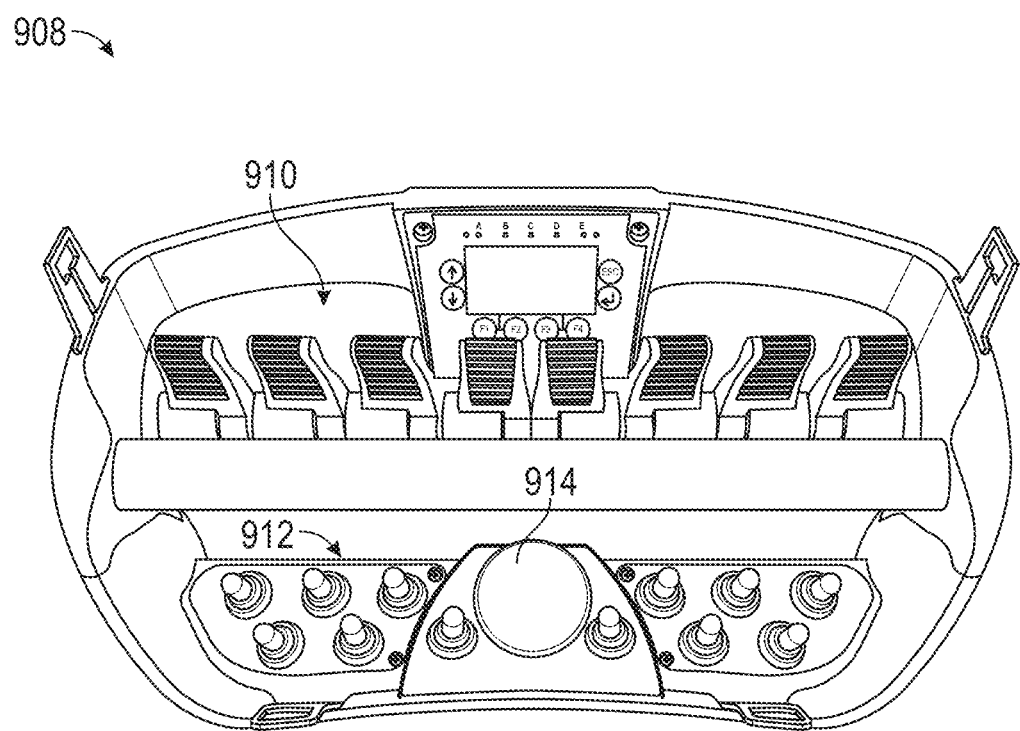

FIG. 9B presents exemplary control box 908 utilized by foreman operator 906. Various operations of aerial device 100 may be controlled by inputs of control box 908. The inputs described here are exemplary and may be arranged in any configuration. In some embodiments, the configuration may be customizable by foreman operator 906.

In some embodiments, control box 908 comprises various device inputs 910 controlling various components on aerial device 100. Device inputs 910 may control various operations of aerial device 100 for controlling various components such as, for example, turntable 106, boom assembly 104, aerial robot system 300, auxiliary arm 304, alternate auxiliary arm 366, as well as various components such as a plurality of outriggers for stabilizing aerial device 100. In some embodiments, control box inputs 912 may be operable to control various modes and operations of aerial device 100 as described below.

When Cartesian mode is selected, foreman operator 906 may control aerial device 100 by operating device inputs. When in Cartesian mode device inputs 910 correlate to Cartesian directions relative to the boom tip. For example, forward on device inputs 910 may move boom towards the aerial robot system 300. In another example, when aerial device is in joint mode, each input paddle of device inputs 910 may correlate to each joint of boom assembly 104. As such, in either Cartesian mode or joint mode, foreman operator 906 may control every aspect of boom assembly 104 for placement of aerial robot system 300 in work environment 400. Furthermore, as described above auxiliary arm 304 may also be controlled in Cartesian mode or joint mode.

In some embodiments, control box inputs 912 may be operational to control various modes and operations of aerial device 100. For example, a toggle switch providing by, in some embodiments, radio communication a signal to aerial device 100 may control carrier mode vs unit mode. Carrier mode may be implemented while boom assembly 104 is stowed and aerial device 100 is ready for transport. Unit mode may only be implemented when the outriggers are deployed and aerial device 100 is ready for work operations described above.

In some embodiments, as foreman operator 906 may take over control of aerial device 100 at any time, a toggle switch of control box inputs 912 may switch modes between VR control and radio control. In VR control mode, operator 120 may control aerial device 100 utilizing the VR components and interacting with VR interface 502 as described above. At any point, foreman operator 906 may switch the toggle changing modes to radio mode and take control of aerial device 100. In radio mode, device inputs 910 may be used to control aerial robot system 300, auxiliary arm 304, alternate auxiliary arm 366, and any other components of aerial device 100.

Furthermore, foreman operator 906 can select E-stop button 914 and take over control of all operations as described above. At any point foreman operator 906 may select E-stop button 914 to immediately lock operations of aerial device 100, aerial robot system 300, auxiliary arm 304, and other components of aerial device 100 either alone or in combination. For example, foreman operator 906 may have a more global perspective of work environment 400 than operator 120. As such, foreman operator 906 may see potential difficulties and stop all operations be selecting E-stop button 914.

PROCESS EXAMPLES

Figure 10:
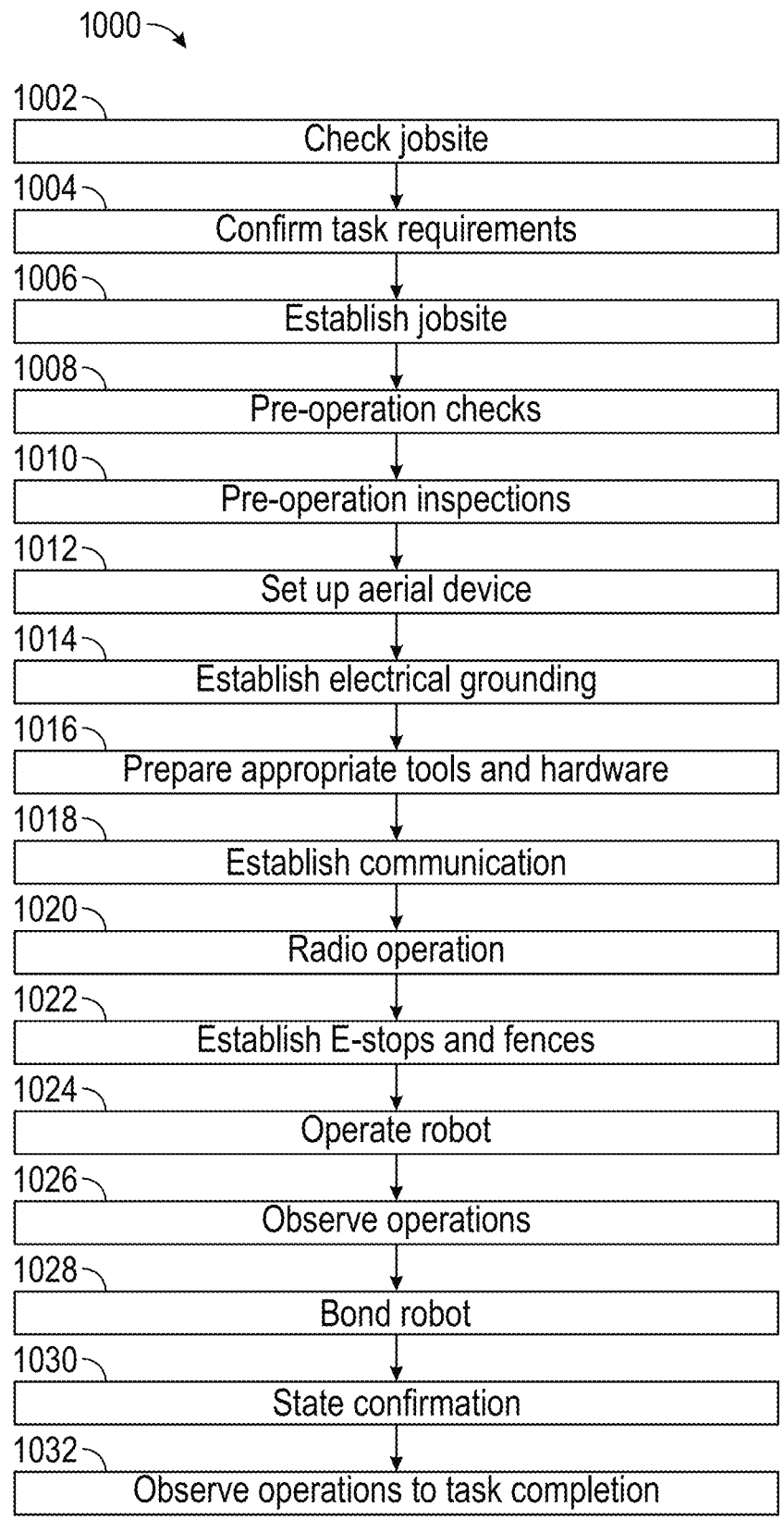
FIG. 10 depicts an exemplary process of operator and foreman operator setting up a jobsite and conducting task operations.

FIG. 10 depicts an exemplary joint operation process 1000 for operator 120 and foreman operator 906 to set up jobsite 900 and control aerial device 100. In some embodiments, the process begins with foreman operator 906 conducting a jobsite review. At step 1002, foreman operator 906 checks jobsite 900. Checking jobsite 900 at least includes checking weather conditions, ground conditions, vegetation, and the surroundings of work environment 400 to verify conditions are appropriate for operation.

At step 1004, foreman operator 906 confirms task requirements. Foreman operator 906 may review the planned tasks such as, of example, replacing an insulator on a power line. Foreman operator 906 may conduct a quick inspection of the power line to verify that task is correct and that there doesn't appear to be any other work than needs to be done (e.g., clearing vegetation or maintenance work that can be handled using aerial robot system 300).

At step 1006, foreman operator 906 may create/maintain the jobsite. Foreman operator 906 may select an appropriate location to set up aerial device 100 and establish barriers around the jobsite according to known specifications in the regions. Foreman operator 906 may also verify that the jobsite meets and is able to meet all known federal and state safety regulations before work begins.

At step 1008, foreman operator 906 along with operator 120, in some embodiments, perform pre-operations checks to verify that aerial device 100 is operational and in the appropriate location to complete the scheduled tasks. For example, based on any loads that may be carried by aerial robot system 300, aerial device 100 must be in a location where the geometry of boom assembly 104 can carry the load within the allowable range. As such, foreman operator 906 and operator 120 must verify that the location and configuration of aerial device 100 through operation will fall within the guidelines of the task.

At step 1010, foreman operator 906 and, in some embodiments, operator 120 may perform pre-operation checks on aerial device 100. Pre-operational checks may include inspections of all electrical, hydraulic, mechanical, optical, pneumatic systems, and the like of aerial device 100 including aerial robot system 300.

At step 1012, mechanized setup of aerial device 100 may be performed by operator 120 and foreman operator 906. This may include moving aerial device 100 in place and/or testing all components to verify that aerial device 100 including aerial robot system 300 are operational and prepared to handle the current task.

At step 1014, the aerial device may be grounded in preparation for work on live power lines. In the case where aerial device 100 will operate on live lines carrying electrical energy, aerial device 100 can be grounded to ensure proper electrical grounding of aerial device 100.

At step 1016, foreman operator 906 and operator 120 may prepare aerial robot system 300 with the appropriate tools and hardware for the tasks to be performed. Using the example from above, the task may be to exchange a faulty insulator. As such, a new insulator, nuts, bolts, tie wire, and the like may be positioned on aerial robot system 300. Furthermore, any tools may be positioned on tool rack 334 such as, for example, wrenches, tie wire tools, clamps, and the like for performing the task.

At step 1018, communications may be established between aerial robot system 300 and jobsite personnel. Communication may be established between the components of block diagram 200. For example, operator 120 utilizing head-up display 124 and input devices 122 may communicatively connect with aerial robot system 300 and foreman operator 906. As such, VR interface 502 may be established such that operator 120 may select features on VR interface 502, thereby initiating action by aerial robot system 300.

At step 1020, gross unit operation via radio remote may be established. Here, foreman operator 906 may control various functions of aerial device 100 and aerial robot system 300. Various controls and E-stops may be tested to verify that foreman operator 906 can take over and control aerial device 100.

At step 1022, various automatic stops and limitations may be placed on aerial robot system 300 to ensure clearances from electrical potentials and collisions. The automatic stops and limitations may be established by electrical detection of potentials and virtual fences as described above.

At step 1024, operation of aerial robot system 300 commences. Operator 120 may control aerial robot system 300 while foreman operator 906, at step 1026, closely watches and verifies each operation to complete the task from a secondary vantage point. Here, foreman operator 906 confirms that all actions are being conducted in accordance with the current task while viewing the work environment 400.

At step 1028 operator 120 may bond bonding unit 424 to phase 408 and test bonding utilizing sensors on boom assembly 104. Furthermore, at step 1030, foreman operator 906 confirms the state of boom tip bond-on by monitoring voltage leakage across the insulating section of the aerial device 100. As work continues, foreman operator 906 and operator 120 continue to monitor current leakage across the boom assembly 104. During all operations, at step 1032, foreman operator 906 maintains a 360 view of jobsite 900 and watches for hazards and communicates with operator 120 as a second pair of eyes from a different vantage point. At any time, foreman operator may halt operations and take over control of aerial robot system 300.

Figure 11:
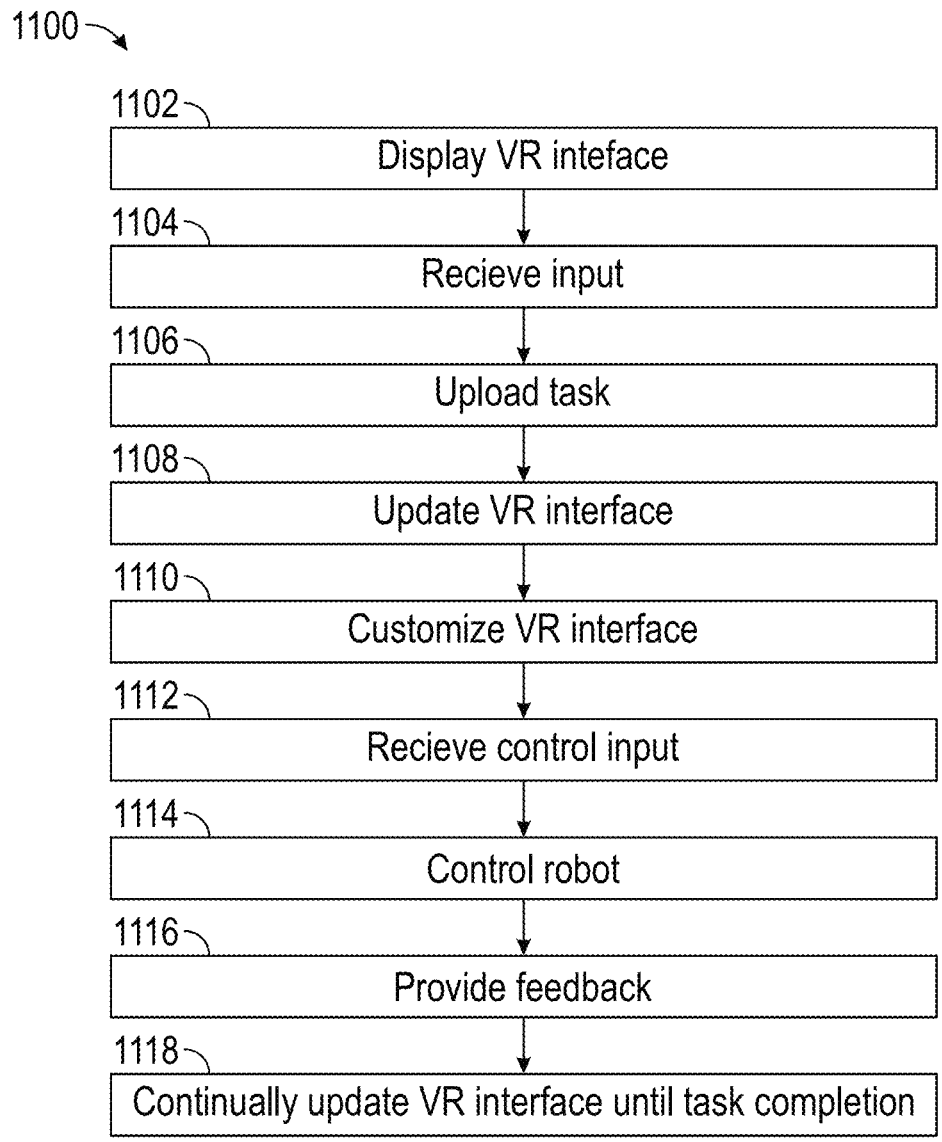
FIG. 11 depicts an exemplary process of operating robot system using the virtual reality interface.

FIG. 11 depicts an exemplary process of causing display of VR interface 502, selection of icons, and carrying out a task utilizing menus, coaching, and automations referenced herein by reference numeral 1100. At step 1102, VR interface 502 may be displayed by head-up display 124. As described above, communication may be established between the components depicted in block diagram 200. VR interface 502 may provide a base setup based on the most recently completed task or may start with an initiation sequence requesting information from operator 120. In some embodiments, VR interface 502 may request a task and customizations by operator 120. In some embodiments, communication with remote assembly 202 may be established before setup of VR interface 502 as described below.

At step 1104, control system 280 comprising input devices 122 may receive input from operator 120 and transmit the commands to remote assembly 202 comprising aerial robot system 300 including auxiliary arms 304, 366. Operator 120 may manually control aerial robot system 300 to prepare for operation to complete the task. Here, operator 120 may check all controls and video feeds as well as conduct any simulated tasks to prepare for real completion of the tasks.

At step 1106, a task may be uploaded to VR interface 502. In some embodiments, operator 120 may navigate main menu 540 or task menu 524 and select a task. In some embodiments, a task may be an entire work task for operation such as, for example, replacing an insulator. In some embodiments, tasks may be individual operations such as, for example, dispose of an insulator. Selection of the task may be performed by operator 120 from any menu displayed on VR interface 502. Upon selection of the task, scripts associated with the task may be uploaded from a database to a current operational storage to execute the functions associated with the task. The task scripts may update VR interface 502, provide communication connections, provide E-stops, and allow operator 120 to control various components of aerial device 100 based on the selected task.

Upon selection and upload of the task, the process moves to step 1108, where the task scripts may upload and cause display of coach screen 616, meta scripts 618, 620, quick menu 506, and flyout menu 534 by VR interface 502. The instructions and selectable icons features displayed by VR interface 502 may be based on the selected task as described above. For example, coach screen 616 and meta scripts 618 may provide a list of actions and instructions for completing the task. Quick menu 506 may display options selectable icons that initiate operator that are necessary to complete the task. Furthermore, flyout menu 534 may provide automation options and tools selection icons that are necessary to complete the task. VR interface 502 may be automatically populated with all options for operator 120 to complete the selected task.

At step 1110, VR interface may be customized based on input by operator 120. Operator 120 may initiate a VR configuration mode by main menu 540 and alter the configuration of VR interface 502. For example, operator 120 may select various icons associated with main menu 540 to add to quick menu 506 and flyout menu 534. In an exemplary scenario a insulator may be damaged such that the standard tool used to remove insulators is no longer applicable. As such, operator 120 may add to flyout menu 534 a more generalized tool that may be used. As such, when the time comes to grip insulator, the more generalized vice grip may be available by flyout menu 534 such that operator 120 does not stop operation and search for the tool. Furthermore, in some embodiments, operator 120 may simply be more comfortable utilizing tools alternative to those typically used and may customize flyout menu 534 and quick menu 506 for selection of those tools.

When all operations have been tested and VR interface is prepared, the process may move to step 1112. At step 1112, VR interface 502 may receive input from operator 120 by input devices 122 to control operation of robot unit 302 to complete the task. Operator 120 may select inputs on input devices 122 and foot pedal 700 to change modes of aerial device 100, operate aerial robot system 300, and select automatons by VR interface 502. Operator 120 may select VR interface mode and select icons displayed by VR interface to initiate automations of aerial robot system 300 such, for example, retrieve insulator, dispose of insulator, bond onto phase 408, and the like. Furthermore, operator 120 may change modes to manual operation and take control of aerial robot system 300 to perform tasks manually using input devices 122.

At step 1114, inputs may be relayed to remote assembly 202 for manual operation and automated operations of aerial robot system 300 based on the above-referenced selections of operator 120. Accordingly, as operator 120 provides input to input devices 122, aerial robot system 300 carries out the actions as instructed.

At step 1116, VR interface 502 may provide real-time feedback to operator 120 during task operations. Real-time feedback may comprise providing video feed 504 and secondary display 622 as well as providing notifications and haptic feedback to operator 120 and foreman operator 906. Furthermore, any state indications may be continuously updated such as, for example, 602, E-stop state indicator 604, foot pedal state indicator 606, bond state indicator 608, task indicator 610, provided by task menu 524.

Furthermore, as actions and tasks are completed, coach screen 616, meta scripts 618, 620, quick menu 506, and flyout menu 534, are updated in real time at step 1118 during task operations until the task is complete. As described above, meta scripts 618, 620 may update to display the next action and coach screen 616 may display the next requested task for operator 120 as well as providing instructions how to perform the next task.

In some aspects, the techniques described herein relate to a system providing a virtual reality user interface for use with a remotely controlled robot to complete a work task. The system includes a robot configured to perform work in a work environment, at least one camera associated with the robot and configured to provide a video feed, a display configured to display the video feed from the at least one camera, one or more input devices configured to receive inputs from an operator, at least one processor, and one or more non-transitory computer-readable media storing computer-executable instructions that, when executed by the at least one processor, perform a method of providing the virtual reality user interface. The method includes obtaining the video feed from the at least one camera, causing display of the video feed by the display, generating a menu including a plurality of icon features, causing display of the menu on the display and over the video feed, receiving, by the one or more input devices, a selection of an icon feature of the plurality of icon features of the menu, and initiating automated control of the robot based on the selection of the icon feature.

In some aspects, the techniques described herein relate to a system, wherein the robot is disposed on a boom of an aerial device and the operator is viewing the display at a remote location.

In some aspects, the techniques described herein relate to a system, further including: a foot pedal operable to control a mode of the aerial device, wherein the mode of the aerial device includes a Cartesian coordinate mode and a joint isolation mode.

In some aspects, the techniques described herein relate to a system, further including: at least one sensor providing data indicative of a state of the robot, obtaining the data indicative of the state of the robot from the at least one sensor, wherein the automated control of the robot is further based on the state of the robot; and displaying the data indicative of the state of the robot by the display.

In some aspects, the techniques described herein relate to a system, wherein the automated control of the robot includes operating at least one utility arm of the robot and operating at least one auxiliary arm disposed on an aerial platform proximate the robot.

In some aspects, the techniques described herein relate to a system, wherein the operator controls the robot from a remote location, and wherein the system further includes: a control box including a plurality of inputs operable by a foreman operator to take control of the robot from the operator.

In some aspects, the techniques described herein relate to a system, wherein the method further includes: causing display of meta scripts configured to notify the operator of current subtasks and future subtasks to complete the work task; and providing task icons selectable by the operator to initiate current automations of the current subtasks and future automations of the future subtasks.

In some aspects, the techniques described herein relate to a system, wherein the video feed is a first video feed and is from a first camera of the at least one camera, wherein the system includes a second camera, and wherein the method further includes causing display, by the display, of a second video feed from the second camera.

In some aspects, the techniques described herein relate to one or more non-transitory computer-readable media storing computer-executable instructions that, when executed by at least one processor, perform a method of providing a virtual reality user interface for controlling a robot to complete a work task. The method includes obtaining a video feed from a camera associated with the robot, causing display of the video feed by a display, generating a menu including a plurality of icon features, causing display of the menu on the display and over the video feed, receiving, by one or more input devices and by an operator, a selection of an icon feature of the plurality of icon features of the menu, and initiating automated control of the robot based on the selection of the icon feature.

In some aspects, the techniques described herein relate to a media, wherein the robot is disposed on a boom of an aerial device, wherein the automated control of the robot is disposing of a damaged component of a power line and retrieving a new component for replacement.

In some aspects, the techniques described herein relate to a media, wherein the method further includes: providing at least one submenu when a main menu icon feature is selected; and displaying the icon feature by a flyout menu for initiating the automated control upon selection.

In some aspects, the techniques described herein relate to a media, wherein the robot is disposed at a boom tip of an aerial device, wherein the method further includes receiving input from a foot pedal operable to control a mode of the aerial device, and wherein the mode of the aerial device includes a Cartesian coordinate mode and a joint isolation mode.

In some aspects, the techniques described herein relate to a media, wherein the method further includes electronically blocking the operator from moving components of the robot while the automated control of the robot is in operation.

In some aspects, the techniques described herein relate to a media, wherein the method further includes causing display of instructions for completing the work task and a list of subtasks to complete the work task.

In some aspects, the techniques described herein relate to a media, wherein the method further includes causing display of a coach screen including the instructions for completing a subtask of the list of subtasks, and wherein the instructions include a request for the operator to initiate the automated control of the robot to complete the subtask.

In some aspects, the techniques described herein relate to a method of providing a virtual reality user interface for controlling a robot to complete a work task. The method includes obtaining a video feed from a camera associated with the robot, causing display of the video feed by the display, generating a menu including a plurality of icon features, causing display of the menu on the display and over the video feed, receiving, by one or more input devices and by an operator, a selection of an icon feature of the plurality of icon features of the menu, and initiating automated control of the robot based on the selection of the icon feature.

In some aspects, the techniques described herein relate to a method, further including: providing at least one submenu when a main menu icon feature is selected; and displaying the icon feature by a flyout menu for initiating the automated control upon selection.

In some aspects, the techniques described herein relate to a method, wherein the automated control of the robot includes operating at least one utility arm of the robot and operating at least one auxiliary arm disposed on an aerial platform proximate the robot.

In some aspects, the techniques described herein relate to a method, causing display of meta scripts configured to notify the operator of current subtasks and future subtasks to complete the work task; and providing task icons selectable by the operator to initiate current automations of the current subtasks and future automations of the future subtasks.

In some aspects, the techniques described herein relate to a method, wherein the robot is disposed on a boom tip of a boom of an aerial device, wherein the operator is positioned at a remote location, and wherein a foreman operator is positioned proximate the aerial device, and wherein the method further includes locking operation of the robot based on an input of a control box operated by the foreman operator.

Although the invention has been described with reference to the embodiments illustrated in the attached drawing figures, it is noted that equivalents may be employed, and substitutions made herein without departing from the scope of the invention.

Having thus described various embodiments of the disclosure, what is claimed as new and desired to be protected by Letters Patent includes the following:

1. A system providing a virtual reality user interface for use with a remotely controlled robot to complete a work task, the system comprising:
   a robot configured to perform work in a work environment;
   at least one camera associated with the robot and configured to provide a video feed;
   a display configured to display the video feed from the at least one camera;
   one or more input devices configured to receive inputs from an operator to control the robot in the work environment and manipulate features of the virtual reality user interface;
   a pedal configured to control a mode of the robot;
   at least one processor; and
   one or more non-transitory computer-readable media storing computer-executable instructions that, when executed by the at least one processor, perform a method of providing the virtual reality user interface, the method comprising:
      obtaining the video feed from the at least one camera;
      causing display of the video feed by the display;
      generating a menu comprising a plurality of icon features,
      wherein at least one icon feature of the plurality of icon features is indicative of an operational mode of the robot;
      causing display of the menu on the display and over the video feed;
      initiating a first mode of the robot when the pedal is in a first pedal configuration and initiating a second mode when the pedal is in a second pedal configuration; and
      displaying an indication of the first mode or the second mode by the display.

2. The system of claim 1, wherein the robot is disposed on a boom of an aerial device and the operator is viewing the display at a remote location.

3. The system of claim 1, further comprising:
   at least one sensor providing data indicative of a state of the robot,
   wherein the method further comprises:
      obtaining the data indicative of the state of the robot from the at least one sensor;
      autonomously controlling the robot based on the state of the robot; and
      displaying the data indicative of the state of the robot by the display.

4. The system of claim 3, wherein the autonomous control of the robot comprises operating at least one utility arm of the robot and operating at least one auxiliary arm disposed on an aerial platform proximate the robot.

5. The system of claim 1,
   wherein the operator controls the robot from a remote location, and wherein the system further comprises:
      a control box comprising a plurality of inputs operable by a foreman operator to take control of the robot from the operator.

6. The system of claim 1, wherein the method further comprises:
   causing display of meta scripts configured to automatically initiate current automations;
   notify the operator of current subtasks and future subtasks to complete the work task; and
   providing task icons selectable by the operator to initiate the current automations of the current subtasks and future automations of the future subtasks.

7. The system of claim 1,
   wherein the video feed is a first video feed and is from a first camera of the at least one camera,
   wherein the system comprises a second camera, and
   wherein the method further comprises causing display, by the display, of a second video feed from the second camera.

8. The system of claim 1, wherein the first mode is a cartesian coordinate mode and the second mode is a joint isolation mode.

9. One or more non-transitory computer-readable media storing computer-executable instructions that, when executed by at least one processor, perform a method of providing a virtual reality user interface for controlling a robot to complete a work task, the method comprising:
   obtaining a video feed from a camera associated with the robot;
   causing display of the video feed by a display;
   generating a menu comprising a plurality of icon features,
   wherein at least one icon feature of the plurality of icon features is indicative of an operational mode of the robot;
   causing display of the menu on the display and over the video feed;
   initiating a first mode of the robot when a pedal is in a first pedal configuration and initiating a second mode when the pedal is in a second pedal configuration; and
   displaying an indication of the first mode or the second mode by the display by the at least one icon feature.

10. The media of claim 9,
    wherein the robot is disposed on a boom of an aerial device, and
    wherein the method further comprises autonomously controlling the robot to dispose of a damaged component of a power line and retrieve a new component for replacement.

11. The media of claim 10, wherein the method further comprises:
    providing at least one submenu when a main menu icon feature is selected; and
    displaying an action icon feature by a flyout menu for initiating the autonomous control upon selection.

12. The media of claim 11, wherein the method further comprises electronically blocking manual inputs from moving components of the robot while the autonomous control of the robot is in operation.

13. The media of claim 9, wherein the method further comprises causing display of instructions for completing the work task and a list of subtasks to complete the work task.

14. The media of claim 13,
    wherein the method further comprises causing display of a coach screen comprising the instructions for completing a subtask of the list of subtasks, and wherein the instructions comprise a request for an operator to initiate automated control of the robot to complete the subtask.

15. The media of claim 9, wherein the first mode is a cartesian coordinate mode and the second mode is a joint isolation mode.

16. A method of providing a virtual reality user interface for controlling a robot to complete a work task, the method comprising:
- obtaining a video feed from a camera associated with the robot;
- causing display of the video feed by the display;
- generating a menu comprising a plurality of icon features, wherein the plurality of icon features includes an icon feature indicative of an operational mode of the robot;
- causing display of the menu on the display and over the video feed; and
- initiating a cartesian coordinate mode of the robot when a pedal is in a first pedal configuration and initiating a joint isolation mode when the pedal is in a second pedal configuration.

17. The method of claim 16, further comprising:
- providing at least one submenu when a main menu icon feature is selected; and
- displaying the icon feature by a flyout menu.

18. The method of claim 16, further comprising autonomously controlling the robot based on a state of the robot by operating at least one utility arm of the robot and operating at least one auxiliary arm disposed on an aerial platform proximate the robot.

19. The method of claim 16,
- causing display of meta scripts configured to notify an operator of current subtasks and future subtasks to complete the work task; and
- providing task icons selectable by the operator to initiate current automations of the current subtasks and future automations of the future subtasks.

20. The method of claim 16,
- wherein the robot is disposed on a boom tip of a boom of an aerial device and is operational to receive wireless communication from a remote operator.

* * * * *